(12) United States Patent
Shimoshikiryoh

(10) Patent No.: US 11,874,577 B2
(45) Date of Patent: Jan. 16, 2024

(54) SEE-THROUGH WINDOW DISPLAY AND LIQUID CRYSTAL DISPLAY

(71) Applicant: SHARP KABUSHIKI KAISHA, Sakai (JP)

(72) Inventor: Fumikazu Shimoshikiryoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/886,236

(22) Filed: Aug. 11, 2022

(65) Prior Publication Data

US 2023/0068177 A1 Mar. 2, 2023

Related U.S. Application Data

(60) Provisional application No. 63/238,014, filed on Aug. 27, 2021.

(51) Int. Cl.
*G02F 1/137* (2006.01)
*G02F 1/1335* (2006.01)
(Continued)

(52) U.S. Cl.
CPC ...... *G02F 1/13712* (2021.01); *G02F 1/13306* (2013.01); *G02F 1/133514* (2013.01); *G02F 1/133531* (2021.01); *G02F 1/134345* (2021.01); *G09G 3/3607* (2013.01); *G09G 3/3614* (2013.01); *G02F 1/133638* (2021.01); *G02F 1/134363* (2013.01); *G02F 1/134372* (2021.01); *G02F 2201/52* (2013.01); *G02F 2203/01* (2013.01); *G02F 2203/30* (2013.01); *G02F 2203/66* (2013.01); *G02F 2413/02* (2013.01);
(Continued)

(58) Field of Classification Search
CPC .................................................. G02F 1/13712
See application file for complete search history.

(56) References Cited

U.S. PATENT DOCUMENTS

| | | | |
|---|---|---|---|
| 2012/0299971 A1 | 11/2012 | Hotelling | |
| 2014/0184968 A1* | 7/2014 | Niikura | G02F 1/1391 |
| | | | 349/167 |

(Continued)

FOREIGN PATENT DOCUMENTS

| | | |
|---|---|---|
| CN | 105929592 A | 9/2016 |
| JP | H05181129 A | 7/1993 |

(Continued)

*Primary Examiner* — Edmond C Lau
(74) *Attorney, Agent, or Firm* — ScienBiziP, P.C.

(57) ABSTRACT

A see-through window display includes a display panel having a plurality of pixels and a drive circuit that applies a voltage according to input gray scale data to the plurality of pixels, in which the display panel includes a first substrate having a pixel electrode, a second substrate, a liquid crystal layer interposed between the first substrate and the second substrate, a first polarizer provided on the first substrate having a first polarization axis, and a second polarizer provided on the second substrate having a second polarization axis, and when a transmittance of each of the pixels when the drive circuit applies a minimum voltage to the pixel is set to TW and a transmittance of each of the pixels when the drive circuit applies a maximum voltage to the pixel is set to TB, the display panel has a normally white characteristic satisfying TW>TB.

6 Claims, 31 Drawing Sheets

(51) Int. Cl.
  *G02F 1/1343*  (2006.01)
  *G09G 3/36*  (2006.01)
  *G02F 1/133*  (2006.01)
  *G02F 1/13363*  (2006.01)

(52) U.S. Cl.
  CPC . *G02F 2413/08* (2013.01); *G09G 2300/0452* (2013.01); *G09G 2300/0823* (2013.01); *G09G 2330/021* (2013.01)

(56) References Cited

U.S. PATENT DOCUMENTS

| | | |
|---|---|---|
| 2016/0343285 A1 | 11/2016 | Yamaguchi |
| 2017/0103716 A1 | 4/2017 | Kita et al. |
| 2017/0146849 A1* | 5/2017 | Tang .................. G02F 1/13471 |

FOREIGN PATENT DOCUMENTS

| | | |
|---|---|---|
| JP | H07159770 A | 6/1995 |
| JP | 2012253446 A | 12/2012 |
| WO | 2014162798 A1 | 10/2014 |
| WO | 2015114943 A1 | 8/2015 |
| WO | 2015/190461 A1 | 12/2015 |

* cited by examiner

| COLOR | R | W | G | W | B | W | R | W | G | W | B | W | R | W | G | W | B | W | R | W | G | W | B | W |
|---|---|---|---|---|---|---|---|---|---|---|---|---|---|---|---|---|---|---|---|---|---|---|---|---|
| POLARITY | + | − | + | − | + | − | + | − | + | − | + | − | + | − | + | − | + | − | + | − | + | − | + | − |

FIG. 25

| COLOR | R | W | G | W | B | W | R | W | G | W | B | W | R | W | G | W | B | W | R | W | G | W | B | W |
|---|---|---|---|---|---|---|---|---|---|---|---|---|---|---|---|---|---|---|---|---|---|---|---|---|
| POLARITY | + | + | − | − | + | + | − | − | + | + | − | − | + | + | − | − | + | + | − | − | + | + | − | − |

FIG. 26

SEE-THROUGH WINDOW DISPLAY AND LIQUID CRYSTAL DISPLAY

CROSS-REFERENCE TO RELATED APPLICATION

The present application claims priority to U.S. Provisional Application Ser. No. 63/238,014, filed Aug. 27, 2021, the content to which is hereby incorporated by reference into this application.

BACKGROUND

1. Field

The disclosure relates to a see-through window display and a liquid crystal display.

2. Description of the Related Art

WO 2015/190461 discloses a see-through window display including a display panel configured to get a transparent display state in which a background can be seen through the display panel. The see-through window display disclosed in WO 2015/190461 includes a panel light source that radiates light of a plurality of colors to the display panel in a time division manner.

SUMMARY

However, the see-through window display disclosed in PTL 1 has a problem in that the background of the display panel appears blurry in the transparent display state.

A see-through window display according to one aspect of the disclosure provides a see-through window display that can prevent a background of the display panel from appearing blurry.

Solution to Problem (1) A see-through window display according to an aspect of the disclosure includes a display panel having a plurality of pixels and a drive circuit that applies a voltage according to input gray scale data to the plurality of pixels, in which the display panel includes a first substrate having a pixel electrode, a second substrate, a liquid crystal layer interposed between the first substrate and the second substrate, a first polarizer provided on the first substrate having a first polarization axis, and a second polarizer provided on the second substrate having a second polarization axis, and when a transmittance of each of the pixels when the drive circuit applies a minimum voltage to the pixel is set to TW and a transmittance of each of the pixels when the drive circuit applies a maximum voltage to the pixel is set to TB, the display panel has a normally white characteristic satisfying a relationship of TW>TB.

(2) The see-through window display according to another aspect of the disclosure has the second polarization axis being parallel to the first polarization axis in the configuration of the see-through window display according to the aspect of (1) described above.

(3) The see-through window display according to another aspect of the disclosure may be configured such that, in the configuration of the see-through window display according to the aspect of (1) or (2) described above, the normally white characteristic of the display panel has a structure in which, when an axis that is parallel to an axis created by rotating the first polarization axis 45 degrees clockwise is set to an a-axis, an axis that is parallel to an axis created by rotating the first polarization axis 45 degrees counterclockwise is set to a b-axis, an a-axis component of a refractive index of the liquid crystal layer is set to na and a b-axis component is set to nb, and a value indicating anisotropy of refractive index of the liquid crystal layer being a difference between a refractive index of the a-axis component and a refractive index of the b-axis component is set to $\Delta n=|na-nb|$, a value of $\Delta n$ when the voltage applied to the plurality of pixels by the drive circuit is lower than or equal to a threshold voltage indicating a boundary of alignment change of liquid crystal molecules of the liquid crystal layer is smaller than a value of $\Delta n$ when the voltage applied by the drive circuit is higher than the threshold voltage.

(4) The see-through window display according to another aspect of the disclosure may be configured such that, in the configuration of the see-through window display according to the aspect of (1) or (2) described above, the normally white characteristic of the display panel has a structure in which, when an axis that is parallel to an axis created by rotating the first polarization axis 45 degrees clockwise is set to an a-axis, an axis that is parallel to an axis created by rotating the first polarization axis 45 degrees counterclockwise is set to a b-axis, an a-axis component of a refractive index of the liquid crystal layer is set to na and a b-axis component is set to nb, a value indicating anisotropy of refractive index of the liquid crystal layer being a difference between a refractive index of the a-axis component and a refractive index of the b-axis component is set to $\Delta n=|na-nb|$, a thickness of the liquid crystal layer is set to d, and a phase difference of the liquid crystal layer is set to $d\Delta n$, a value of $d\Delta n$ when the voltage applied to the plurality of pixels by the drive circuit is lower than or equal to a threshold voltage indicating a boundary of alignment change of liquid crystal molecules of the liquid crystal layer is smaller than or equal to 50 nm.

(5) The see-through window display according to another aspect of the disclosure may be configured such that, in the configuration of the see-through window display according to the aspect of (3) or (4) described above, the liquid crystal layer includes liquid crystal molecules having negative anisotropy of dielectric constant, and when the voltage applied to the plurality of pixels by the drive circuit is lower than or equal to the threshold voltage, the liquid crystal molecules are aligned in a direction in which a long axis of the liquid crystal molecules is perpendicular to an in-plane direction of the liquid crystal layer.

(6) The see-through window display according to another aspect of the disclosure may be configured such that, in the configuration of the see-through window display according to an aspect of any one of (3) to (5) described above, the liquid crystal layer includes liquid crystal molecules, and when the voltage applied to the plurality of pixels by the drive circuit is lower than or equal to the threshold voltage, the liquid crystal molecules are aligned in a direction in which the long axis of the liquid crystal molecules is parallel to the in-plane direction of the liquid crystal layer and parallel to or perpendicular to the first polarization axis.

(7) The see-through window display according to another aspect of the disclosure may be configured such that, in the configuration of the see-through window display according to an aspect of any one of (1) to (6) described above, each pixel of the plurality of pixels includes a red subpixel, a green subpixel, and a blue subpixel, the display panel includes a color filter including a red optical filter film configured to transmit light corresponding to a wavelength range of the red subpixel, a green optical filter film configured to transmit light corresponding to a wavelength range of the green subpixel, and a blue optical filter film configured to transmit light corresponding to a wavelength range of the blue subpixel, and with respect to a voltage-luminance characteristic indicating a correlation between luminance of light transmitted through each of the red optical filter film, the green optical filter film, and the blue optical filter film and a voltage applied to the plurality of pixels, a cell thickness of the liquid crystal layer corresponding to each of the red optical filter film, the green optical filter film, and the blue optical filter film is set such that a minimum value of luminance within a range of the voltage applied to the plurality of pixels by the drive circuit is smaller than or equal to five times the minimum value of the luminance in terms of the voltage-luminance characteristic.

(8) The see-through window display according to another aspect of the disclosure may be configured such that, in the configuration of the see-through window display according to an aspect of any one of (1) to (6) described above, each pixel of the plurality of pixels includes a red subpixel, a green subpixel, and a blue subpixel, the display panel includes a color filter including a red optical filter film configured to transmit light corresponding to a wavelength range of the red subpixel, a green optical filter film configured to transmit light corresponding to a wavelength range of the green subpixel, and a blue optical filter film configured to transmit light corresponding to a wavelength range of the blue subpixel, and a film thickness of the red optical filter film is thinner than a film thickness of each of the blue optical filter film and the green optical filter film, and a difference between the film thickness of the green optical filter film and the film thickness of the blue optical filter film is smaller than or equal to half of a difference between the film thickness of the red optical filter film and the film thickness of the blue optical filter film.

(9) The see-through window display according to another aspect of the disclosure may be configured such that, in the configuration of the see-through window display according to an aspect of any one of (1) to (6) described above, each pixel of the plurality of pixels includes a red subpixel, a green subpixel, and a blue subpixel, the display panel includes a color filter including a red optical filter film configured to transmit light corresponding to a wavelength range of the red subpixel, a green optical filter film configured to transmit light corresponding to a wavelength range of the green subpixel, and a blue optical filter film configured to transmit light corresponding to a wavelength range of the blue subpixel, and a cell thickness of the liquid crystal layer corresponding to the red optical filter film is thicker than a cell thickness of the liquid crystal layer corresponding to each of the blue optical filter film and the green optical filter film, and a difference between the cell thickness of the liquid crystal layer corresponding to the green optical filter film and the cell thickness of the liquid crystal layer corresponding to the blue optical filter film is smaller than or equal to half of a difference between the cell thickness of the liquid crystal layer corresponding to the red optical filter film and the cell thickness of the liquid crystal layer corresponding to the blue optical filter film.

(10) The see-through window display according to another aspect of the disclosure may be configured such that, in the configuration of the see-through window display according to an aspect of any one of (1) to (6) described above, each pixel of the plurality of pixels includes a red subpixel, a green subpixel, a blue subpixel, and a white subpixel, the display panel includes a color filter including a red optical filter film configured to transmit light corresponding to a wavelength range of the red subpixel, a green optical filter film configured to transmit light corresponding to a wavelength range of the green subpixel, a blue optical filter film configured to transmit light corresponding to a wavelength range of the blue subpixel, and a white optical filter film configured to transmit light corresponding to the white subpixel, and a ratio of an area occupied by the white subpixel with respect to an area occupied by the red subpixel, the green subpixel, and the blue subpixel in each pixel is in a range from 0.5 to 1.5.

(11) The see-through window display according to another aspect of the disclosure may be configured such that, in the configuration of the see-through window display according to an aspect of (10) described above, when the area of each of the red subpixel, the green subpixel, the blue subpixel, and the white subpixel is equal in each pixel, a ratio of the number of white subpixels to a total number of the red subpixels, the green subpixels, and the blue subpixels is in a range from 2/3 to 3/3.

(12) The see-through window display according to another aspect of the disclosure may be configured such that, in the configuration of the see-through window display according to an aspect of (10) or (11) described above, the red subpixel, the green subpixel, and the blue subpixel are disposed in this order, or the red subpixel, the blue subpixel, and the green subpixel are disposed in this order in each pixel, and the white subpixel is interposed between each of the red subpixel, the green subpixel, and the blue subpixel, or between each of the red subpixel, the blue subpixel, and the green subpixel.

(13) The see-through window display according to another aspect of the disclosure may be configured such that, in the configuration of the see-through window display according to an aspect of (12) described above, when a set of adjacent subpixels is set as a subpixel pair in each pixel, the drive circuit applies a voltage with different polarity to each of adjacent subpixel pairs, and applies a voltage to each frame to invert the polarity of each subpixel pair.

(14) The see-through window display according to another aspect of the disclosure may be configured such that, in the configuration of the see-through window display according to an aspect of any one of (1) to (13) described above, in a case where a minimum value of the gray scale data is set to L_min, a maximum value of the gray scale data is set to L_max, and arbitrary values of the gray scale data are set to L_a, L_b, and L_c, and the relationship of L_min<L_a<L_b<L_c<L_max is satisfied, when luminance of the display panel for L_min, L_a, L_b, L_c, and L_max is set to Y_min, Y_a, Y_b, Y_c, and Y_max, respectively, a relationship of $Y=L^\gamma$ indicating a gray scale-luminance characteristic of the display panel is satisfied in which L_b and Y_b are a reference, and $\gamma$ satisfies $\gamma=\log((Y\_b-Y\_min)\div(Y\_max-Y\_min))\div\log((L\_b-L\_min)\div(L\_max-L\_min))$, the drive circuit applies the voltage to the plurality of pixels so that the relationships of $Y\_a<((L\_a-L\_min)\div(L\_max-L\_min))^\gamma$ and $Y\_c>((L\_c-L\_min)\div(L\_max-L\_min))^\gamma$ are satisfied.

(15) A liquid crystal display according to an aspect of the disclosure includes a display panel with a plurality of pixels, the display panel including a first substrate having a pixel electrode, a second substrate, a liquid crystal layer sandwiched between the first substrate and the second substrate, a first polarizer provided on the first substrate having a first polarization axis, a second polarizer provided on the second substrate having a second polarization axis, and a retardation film that is provided at least between the liquid crystal layer and the first polarizer or between the liquid crystal layer and the second polarizer, and a drive circuit configured to apply a voltage according to input gray scale data to the plurality of pixels, in which, when an axis that is parallel to an axis created by rotating the first polarization axis 45 degrees clockwise is set to an a-axis and an axis that is parallel to an axis created by rotating the first polarization axis 45 degrees counterclockwise is set to a b-axis, an axis direction of a slow axis of the retardation film matches an axis direction of the a-axis or the b-axis, and a phase difference of light transmitted through the retardation film is 50 nm or less, and a slow axis of the liquid crystal layer matches the axis direction of the a-axis or the b-axis, and a phase difference of light transmitted through the liquid crystal layer is 50 nm or less when a voltage applied to the plurality of pixels by the drive circuit is lower than or equal to a threshold voltage indicating a boundary of alignment change of liquid crystal molecules of the liquid crystal layer.

(16) The liquid crystal display according to another aspect of the disclosure may be configured such that, in the configuration of the liquid crystal display according to the aspect of (15) described above, the liquid crystal layer includes liquid crystal molecules having negative anisotropy of dielectric constant, and when the voltage applied to the plurality of pixels by the drive circuit is lower than or equal to the threshold voltage, the liquid crystal molecules are aligned in a direction in which a long axis of the liquid crystal molecules is perpendicular to an in-plane direction of the liquid crystal layer.

(17) The liquid crystal display according to another aspect of the disclosure may be configured such that, in the configuration of the liquid crystal display according to the aspect (15) or (16) described above, each pixel of the plurality of pixels includes a red subpixel, a green subpixel, and a blue subpixel, the display panel includes a color filter including a red optical filter film configured to transmit light corresponding to a wavelength range of the red subpixel, a green optical filter film configured to transmit light corresponding to a wavelength range of the green subpixel, and a blue optical filter film configured to transmit light corresponding to a wavelength range of the blue subpixel, and with respect to a voltage-luminance characteristic indicating a correlation between luminance of light transmitted through each of the red optical filter film, the green optical filter film, and the blue optical filter film and a voltage applied to the plurality of pixels, a cell thickness of the liquid crystal layer corresponding to each of the red optical filter film, the green optical filter film, and the blue optical filter film is set such that a minimum value of luminance within a range of the voltage applied to the plurality of pixels by the drive circuit is smaller than or equal to five times the minimum value of the luminance in terms of the voltage-luminance characteristic.

(18) The liquid crystal display according to another aspect of the disclosure may be configured such that, in the configuration of the liquid crystal display according to the aspect of any one of (15) or (16) described above, each pixel of the plurality of pixels includes a red subpixel, a green subpixel, and a blue subpixel, the display panel includes a color filter including a red optical filter film configured to transmit light corresponding to a wavelength range of the red subpixel, a green optical filter film configured to transmit light corresponding to a wavelength range of the green subpixel, and a blue optical filter film configured to transmit light corresponding to a wavelength range of the blue subpixel, and a film thickness of the red optical filter film is thinner than a film thickness of each of the blue optical filter film and the green optical filter film, and a difference between the film thickness of the green optical filter film and the film thickness of the blue optical filter film is smaller than or equal to half of a difference between the film thickness of the red optical filter film and the film thickness of the blue optical filter film.

(19) The liquid crystal display according to another aspect of the disclosure may be configured such that, in the configuration of the liquid crystal display according to the aspect of (15) or (16) described above, each pixel of the plurality of pixels composing an image displayed on the display panel includes a red subpixel, a green subpixel, and a blue subpixel, the display panel includes a color filter including a red optical filter film configured to transmit light corresponding to a wavelength range of the red subpixel, a green optical filter film configured to transmit light corresponding to a wavelength range of the green subpixel, and a blue optical filter film configured to transmit light corresponding to a wavelength range of the blue subpixel, and a cell thickness of the liquid crystal layer corresponding to the red optical filter film is thicker than a cell thickness of the liquid crystal layer corresponding to each of the blue optical filter film and the green optical filter film, and a difference between the cell thickness of the liquid crystal layer corresponding to the green optical filter film and the cell thickness of the liquid crystal layer corresponding to the blue optical filter film is smaller than or equal to half of a difference between the cell thickness of the liquid crystal layer corresponding to the red optical filter film and the cell thickness of the liquid crystal layer corresponding to the blue optical filter film.

(20) The liquid crystal display according to another aspect of the disclosure may be configured such that, in the configuration of the liquid crystal display according to the aspect of (15) or (16) described above, each pixel of the plurality of pixels includes a red subpixel, a green subpixel, a blue subpixel, and a white subpixel, the display panel includes a color filter including a red optical filter film configured to transmit light corresponding to a wavelength range of the red subpixel, a green optical filter film configured to transmit light corresponding to a wavelength range of the green subpixel, a blue optical filter film configured to transmit light corresponding to a wavelength range of the blue subpixel, and a white optical filter film configured to transmit light corresponding to the white subpixel, and a ratio of an area occupied by the white subpixel with respect to an area occupied by the red subpixel, the green subpixel, and the blue subpixel in each pixel is in a range from 0.5 to 1.5.

(21) The liquid crystal display according to another aspect of the disclosure may be configured such that, in the configuration of the liquid crystal display according to the aspect of (20) described above, when the area of each of the red subpixel, the green subpixel, the blue subpixel, and the white subpixel is equal in each pixel, a ratio of the number of white subpixels to a total number of the red subpixels, the green subpixels, and the blue subpixels is in a range from 2/3 to 3/3.

(22) The liquid crystal display according to another aspect of the disclosure may be configured such that, in the configuration of the liquid crystal display according to the aspect of (20) or (21) described above, the red subpixel, the green subpixel, and the blue subpixel are disposed in this order, or the red subpixel, the blue subpixel, and the green subpixel are disposed in this order in each pixel, and the white subpixel is interposed between each of the red subpixel, the green subpixel, and the blue subpixel, or between each of the red subpixel, the blue subpixel, and the green subpixel.

(23) The liquid crystal display according to another aspect of the disclosure may be configured such that, in the configuration of the liquid crystal display according to the aspect of any one of (15) to (22) described above, in a case where a minimum value of the gray scale data is set to L_min, a maximum value of the gray scale data is set to L_max, and arbitrary values of the gray scale data are set to L_a, L_b, and L_c, and the relationship of L_min<L_a<L_b<L_c<L_max is satisfied, when luminance of the display panel for L_min, L_a, L_b, L_c, and L_max is set to Y_min, Y_a, Y_b, Y_c, and Y_max, respectively, a relationship of $Y=L^\gamma$ indicating a gray scale-luminance characteristic of the display panel in which L_b and Y_b are a reference is satisfied, and γ satisfies γ=log ((Y_b−Y_min) ÷(Y_max−Y_min))÷log ((L_b−L_min)÷(L_max−L_min)), and the drive circuit applies the voltage to the plurality of pixels such that the relationships of Y_a<((L_a−L_min)÷ (L_max−L_min))$^\gamma$ and Y_c>((L_c−L_min)÷(L_max− L_min))$^\gamma$ are satisfied.

BRIEF DESCRIPTION OF DRAWINGS

FIG. 25 is a diagram illustrating an example of a correspondence relationship between an array pattern of subpixels constituting each pixel of the display panel and the polarity of each subpixel according to a Comparative Example of the first embodiment of the disclosure.

FIG. 26 is a diagram illustrating an example of a correspondence relationship between an array pattern of subpixels and the polarity of each subpixel in the display panel according to the second modified example of the first embodiment of the disclosure.

DETAILED DESCRIPTION

Figure 1:
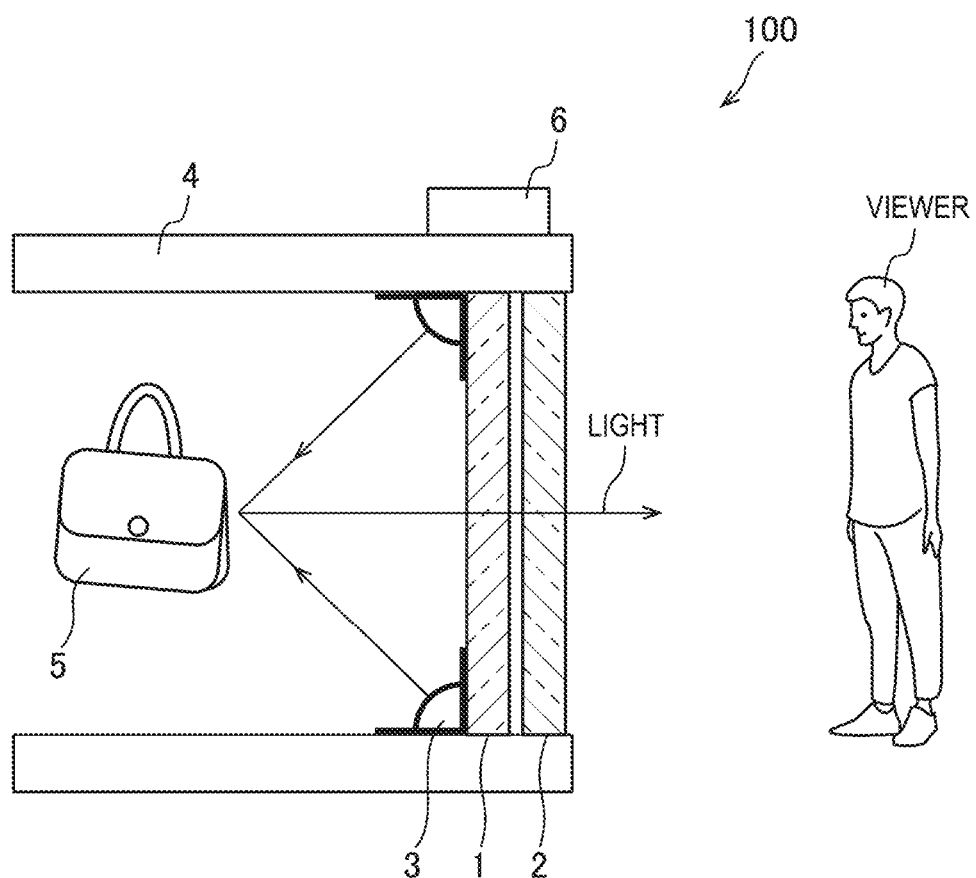
FIG. 1 is a diagram illustrating a schematic configuration of a see-through window display according to a first embodiment of the disclosure.

Hereinafter, embodiments and modified examples of the disclosure will be described with reference to the accompanying drawings. Further, the same reference numerals are assigned to the same or equivalent elements throughout all of the diagrams below to omit overlapping descriptions thereof. In addition, the embodiments and modified examples described below are merely examples of the disclosure, and the disclosure is not limited to the embodiments and modified examples. Various changes can be made to an embodiment other than the embodiments and modified examples according to design and the like as long as the embodiment does not deviate from the technical idea of the disclosure.

First Embodiment

A see-through window display 100 according to a first embodiment of the disclosure will be described with reference to FIG. 1. FIG. 1 is a diagram illustrating a schematic configuration of the see-through window display 100 according to the first embodiment of the disclosure. FIG. 1 schematically illustrates a schematic configuration of the see-through window display 100 when it is viewed from a side.

The see-through window display 100 is a display system in which a back face side of a display panel 1 can be seen through the display panel. The see-through window display 100 can also show information (an image) displayed on the display panel 1 by superimposing the information on the background on the back face side of the display panel 1. Thus, the see-through window display 100 is suitably used in, for example, showcases or show windows.

The see-through window display 100 includes a case 4 having a box shape that houses an exhibit 5, the display panel 1 that is a transmissive liquid crystal panel provided on one side of the case 4, a drive circuit unit 6 (drive circuit), a protective plate 2 disposed on the front side of the display panel 1 to cover the panel surface of the display panel 1, and an illumination unit 3 provided inside the case 4. Further, the side of the display panel 1 on which the illumination unit 3 is provided is referred to as a back face side, and the side opposite to the aforementioned side is referred to as a front face side.

The display panel 1 can be in an image display state in which an image is displayed on the panel surface, or can be in a transparent display state in which a background on the back face side of the display panel 1 is viewed through the display panel 1. In the image display state, a viewer positioned at the front face side of the display panel 1 can view an image displayed on the panel surface of the display panel 1. Meanwhile, in the transparent display state, a viewer can view a background on the back face side of the display panel 1, that is, a background in the case 4. Further, the display panel 1 is configured such that the image display state and the transparent display state can be switched on a pixel-by-pixel basis. Thus, while an image is displayed in a certain region on the panel surface of the display panel 1, a background in the case 4 can be seen through in the remaining region on the panel surface. A configuration of the display panel 1 will be described in detail below.

The drive circuit unit 6 is a circuit that applies a voltage corresponding to gray scale data input from the outside to a plurality of pixels included in the display panel 1 to drive the display panel 1. The display panel 1 can perform display control in accordance with the magnitude of the voltage applied to the plurality of pixels by the drive circuit unit 6.

The protective plate 2 is a plate member for protecting the display panel 1, and can be formed of a transparent glass plate member or an acrylic plate member having light transparency.

The illumination unit 3 emits light including visible light, and may be, for example, a white light emitting diode (LED) that emits white light. The illumination unit 3 is disposed at corners of side surfaces where the display panel 1 is provided in the case 4 as illustrated in FIG. 1. The exhibit 5 disposed in the case 4 can be illuminated by light emitted from the illumination unit 3. The illumination unit 3 can also function as a light source used to display an image on the display panel 1.

Further, in the see-through window display 100, the illumination unit 3 is configured to be used to serve as both a light source for illuminating the exhibit 5 and a light source for displaying an image on the display panel 1. However, the see-through window display may be configured to include an illumination unit that functions as a light source for illuminating the exhibit 5, and an illumination unit that functions as a light source for displaying an image on the display panel 1 separately. In the configuration described above, the illumination unit that functions as a light source for displaying an image on the display panel 1 is provided in the case 4 to emit light toward the display panel 1 without interfering with viewing of the exhibit 5.

The display panel 1 includes a color filter 12 (see FIG. 5 described below) including a red optical filter film 20 that transmits light corresponding to the wavelength range of red subpixels (see FIG. 5 described below), a green optical filter film 21 that transmits light corresponding to the wavelength range of green subpixels (see FIG. 5 described below), and a blue optical filter film 22 that transmits light corresponding to the wavelength range of blue subpixels (see FIG. 5 described below). In addition, light emitted from the illumination unit 3 passes through the color filter 12, and the three colors of red, green, and blue are combined to realize color display.

Further, in order to make the exhibit 5 on the back face side of the display panel be seen therethrough, the display panel 1 may be configured to be not provided with a member on the outside of a polarizer 14 (see FIG. 5 described below) on the back face side of the display panel 1, or to be provided with a member that is transparent to the extent that the exhibit 5 is seen from the front face side of the display panel 1. The transparency required for the see-through window display 100 is defined as, for example, a transmittance of light from the case 4 transmitted through the display panel 1 to be output to the outside, in other words, as a transmittance of light of the see-through window display 100. That is, the transparency required for the see-through window display 100 is a value in the range from 2 percent or higher to 50 percent or lower, and preferably 20 percent when it is expressed by a transmittance of light.

Figure 2:
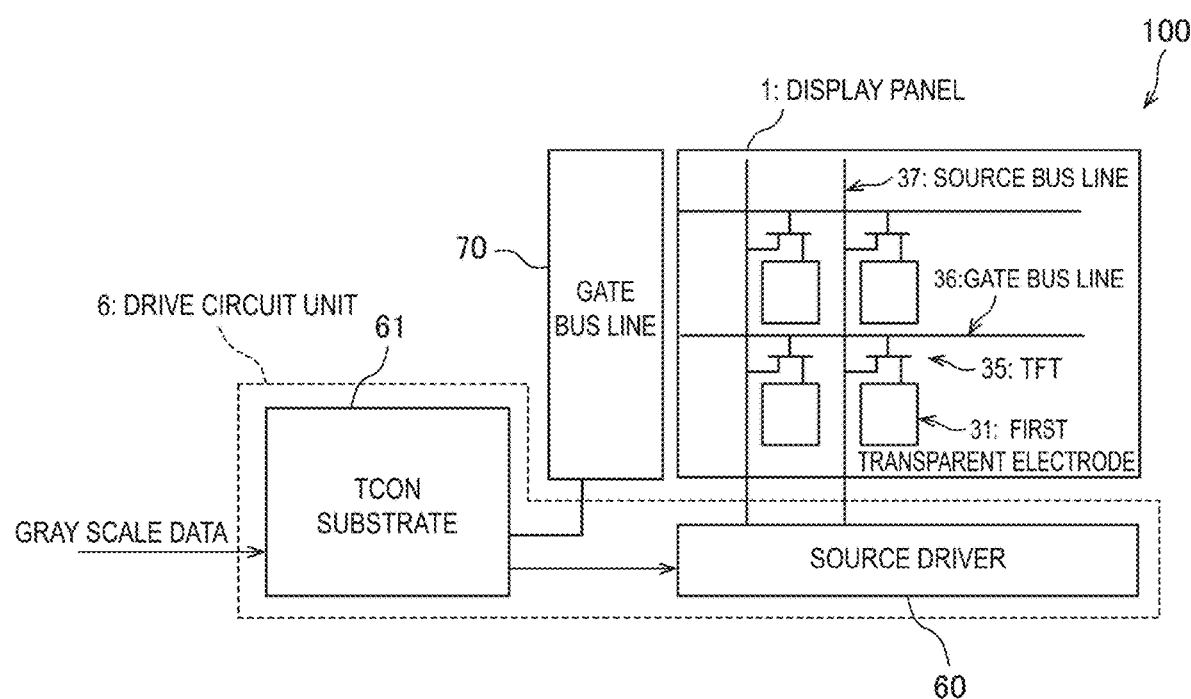
FIG. 2 is a block diagram illustrating an example of a configuration of major parts of the see-through window display according to the first embodiment of the disclosure.
Figure 3:
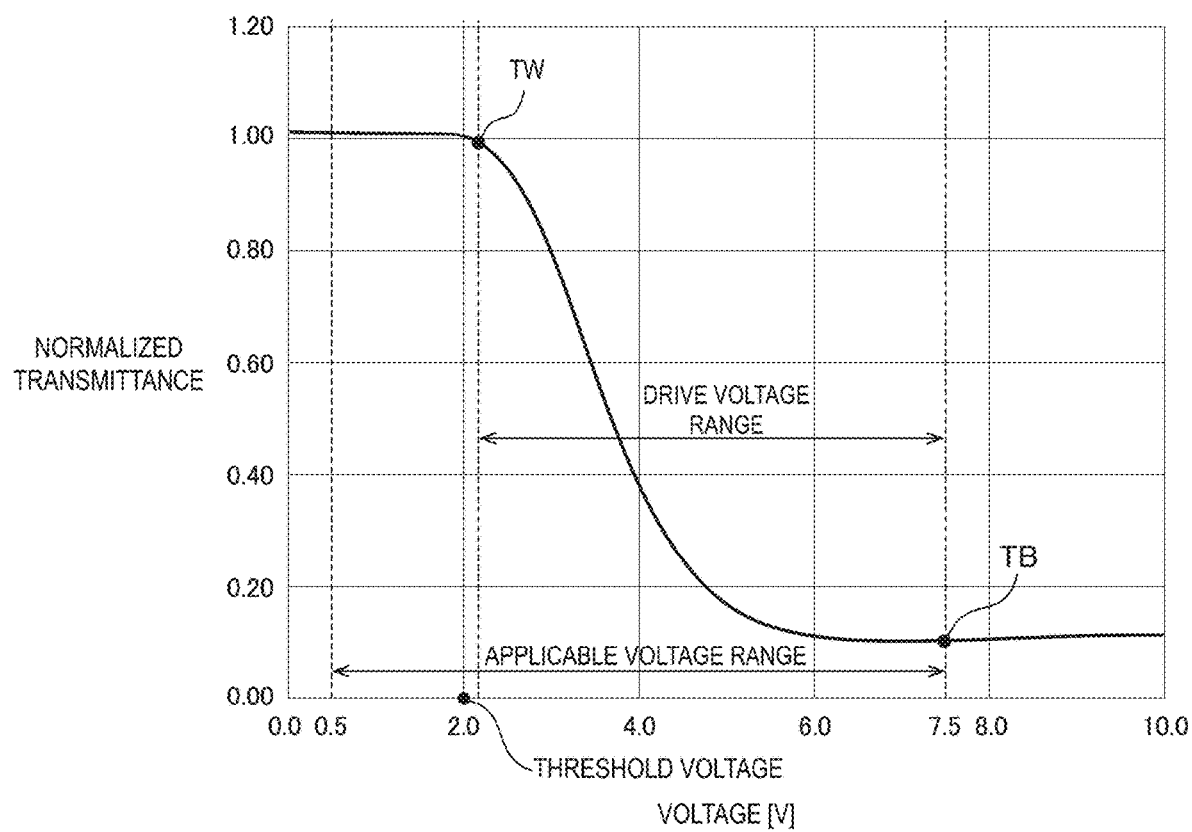
FIG. 3 is a graph showing the relationship between voltages applied to a display panel included in the see-through window display illustrated in FIG. 2 and transmittances of the display panel.
Figure 4:
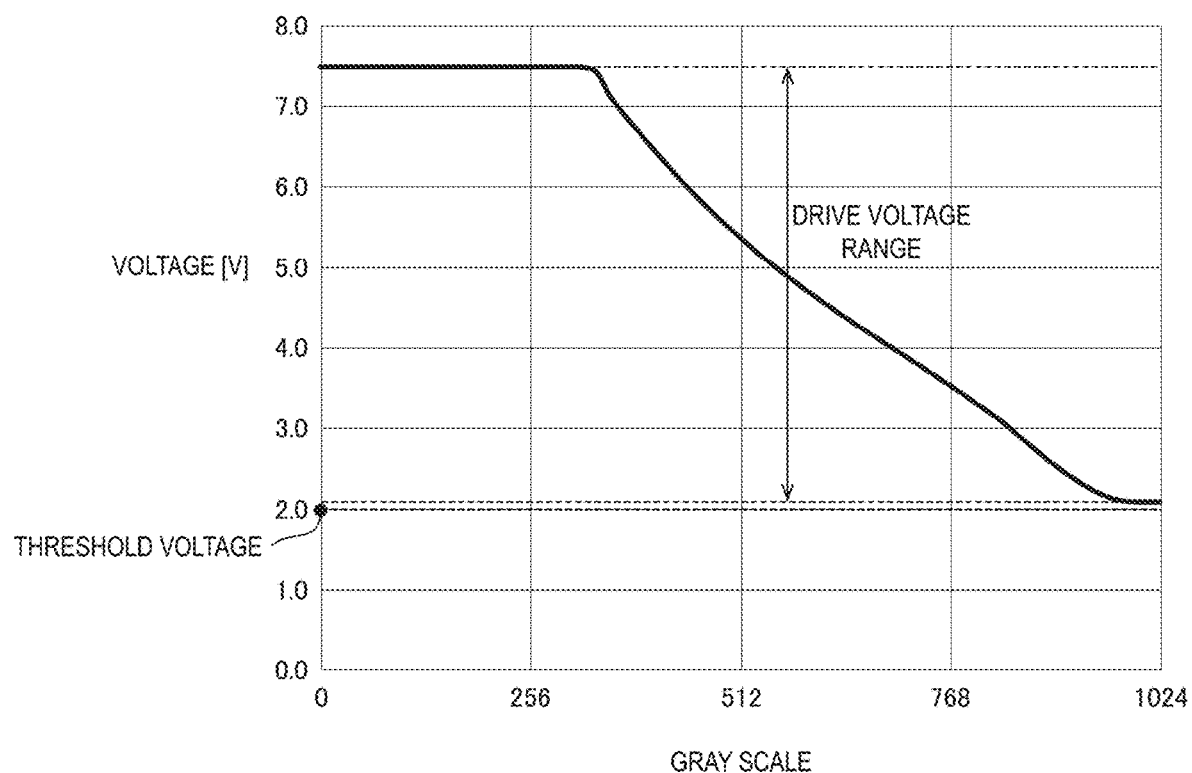
FIG. 4 is a graph showing the relationship between voltages applied to the display panel by a drive circuit unit included in the see-through window display illustrated in FIG. 2 and gray scale that can be expressed on the display panel.

Next, a configuration related to driving of the display panel 1 in the see-through window display 100 according to the first embodiment of the disclosure will be described with reference to FIGS. 2 to 4. FIG. 2 is a block diagram illustrating an example of a configuration of major parts of the see-through window display 100 according to the first embodiment of the disclosure. FIG. 3 is a graph showing the relationship between voltages applied to the display panel 1 included in the see-through window display 100 illustrated in FIG. 2 and transmittances of the display panel 1. In FIG. 3, the vertical axis indicates the transmittances of light transmitted through each of the plurality of pixels of the display panel 1, and the horizontal axis indicates the values of the voltages applied to each of the plurality of pixels of the display panel 1. In addition, FIG. 4 is a graph showing the relationship between voltages applied to the display panel 1 by the drive circuit unit 6 included in the see-through window display 100 illustrated in FIG. 2 and gray scale that can be expressed on the display panel 1. In FIG. 4, the vertical axis is an example of the values of the voltages applied to each pixel of the display panel 1, and the horizontal axis indicates the number of levels of gray scale that can be expressed by the display panel 1. The display panel 1 can handle 1024 levels of gray scale for each color of R, G, and B.

In other words, the display panel 1 includes a plurality of pixels, and a first electrode 31 (pixel electrode) and a TFT 35 are provided to correspond to each pixel. In addition, although not illustrated in FIG. 2, a second electrode 32 is provided at a position facing the first electrode 31. Furthermore, the display panel 1 can perform gray scale control on a pixel-by-pixel basis by switching between an ON state and an OFF state of input of a signal to the first electrode 31 using the TFT 35.

That is, in the display panel 1, the drive circuit unit 6 inputs gray scale data (for example, any value among 0 to 1024 levels of gray scale) to a source driver 60 via a TCON substrate 61. The source driver 60 applies a voltage that is within the range of the drive voltage of the display panel 1 to the source of the TFT 35 through a source bus line 37 in accordance with the input gray scale data. Further, a gate driver 70 applies a Hi voltage to the gate of the TFT 35 through a gate bus line 36. When the Hi voltage is applied to the gate from the gate driver 70, the TFT 35 is brought into an ON state, and a source signal is supplied to the first electrode 31 from the source driver 60. In this manner, in the display panel 1, the drive circuit unit 6 performs gray scale control on a pixel-by pixel basis.

Further, in the see-through window display 100, the voltage range in which a voltage can be applied to the display panel 1 from the drive circuit unit 6 is the range from 0.5 V to 7.5 V as shown in FIG. 3. A threshold voltage indicating a boundary of alignment change of liquid crystal molecules of the liquid crystal layer 10 is 2.0 V, and actually, the drive voltage range applied to each pixel from the drive circuit unit 6 to drive the display panel 1 is greater than 2.0 V, for example, the range from about 2.2 V to 7.5 V. A transmittance when a minimum voltage within the range of the drive voltage is applied to the pixels is set to TW, and a transmittance when a maximum voltage is applied to the pixels is set to TB as shown in FIG. 3. In addition, TW and TB have a so-called normally white characteristic that satisfies the relationship of TW>TB.

Additionally, the drive circuit unit 6 controls voltages for each gray scale one by one within the range of the drive voltage such that gray scale-luminance characteristics of the display panel become predetermined gray scale-luminance characteristics as described below as shown in FIG. 4.

If light is scattered when being transmitted through the display panel 1 in the transparent display state, a viewer views the exhibit 5 disposed in the case 4 in a blurry state. Thus, in the see-through window display 100 according to the first embodiment, the display panel 1 has the following configuration in order to prevent a background on the back face side of the display panel 1 from being viewed in a blurry state.

Configuration of Display Panel

A detailed configuration of the display panel 1 will be described below referring to FIGS. 5 and 6. FIG. 5 is a perspective view schematically illustrating a configuration of major parts of the display panel 1 according to the first embodiment of the disclosure. FIG. 6 is a perspective view schematically illustrating an example of a transmission state of light through the display panel 1 illustrated in FIG. 5.

Figure 5:
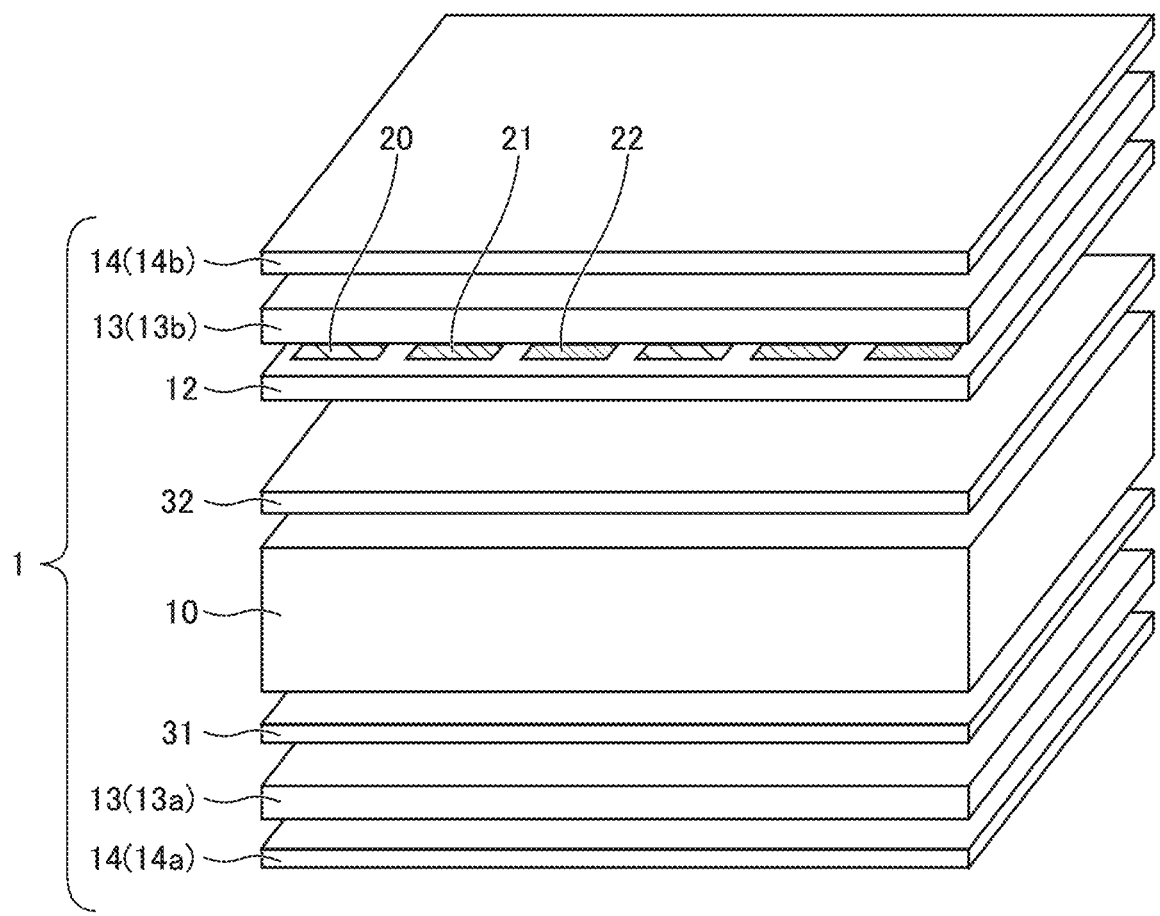
FIG. 5 is a perspective view schematically illustrating a configuration of major parts of the display panel according to the first embodiment of the disclosure.
Figure 6:
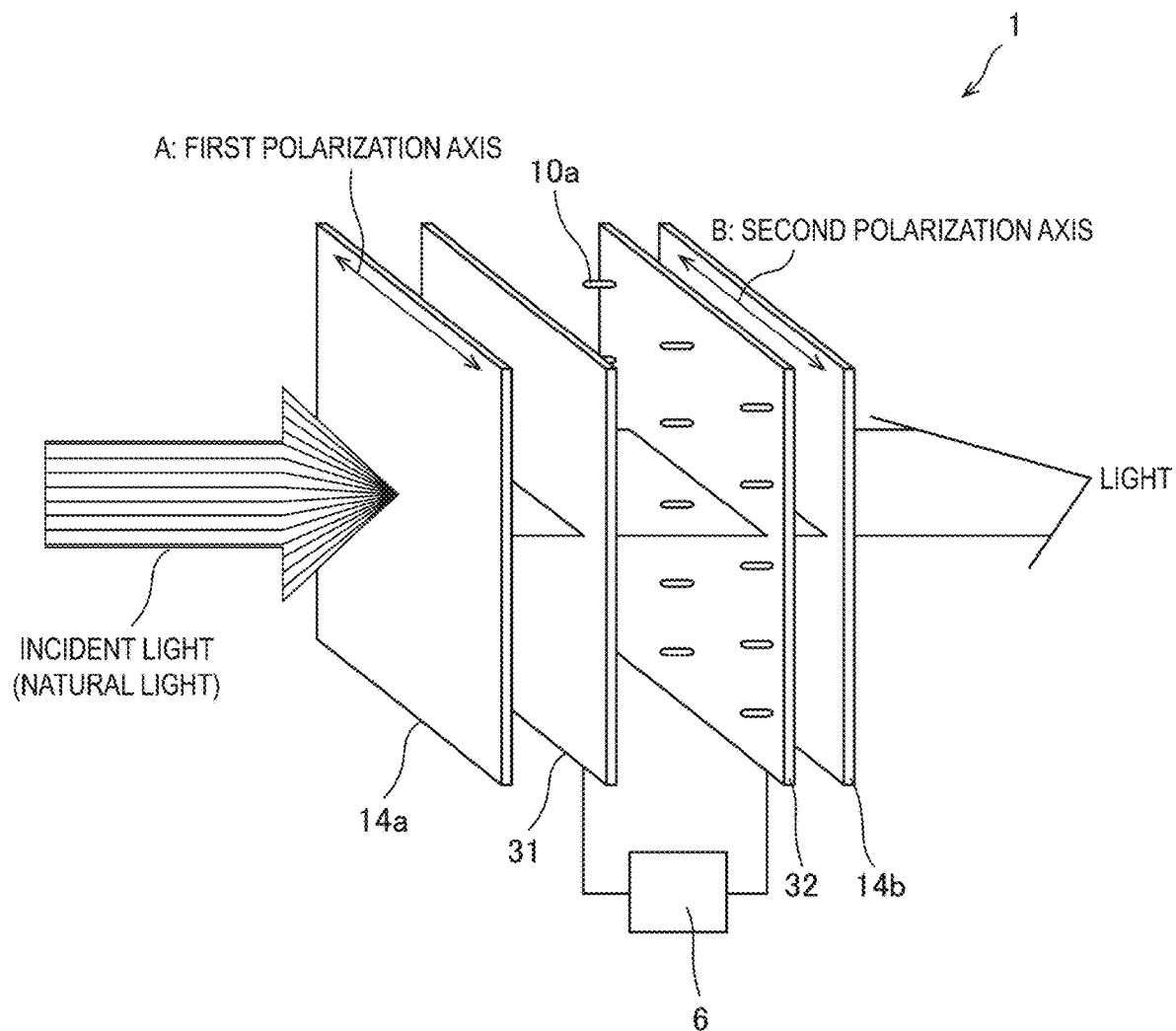
FIG. 6 is a perspective view schematically illustrating an example of a transmission state of light through the display panel illustrated in FIG. 5.

The display panel 1 includes the first electrode 31, the second electrode 32, the color filter 12, a pair of glass substrates 13 (including a first glass substrate 13a and a second glass substrate 13b), and a pair of polarizers 14 (including a first polarizer 14a and a second polarizer 14b) as illustrated in FIG. 5.

The polarizers 14 include the first polarizer 14a provided on one side (the back face side) of the liquid crystal layer 10 having a first polarization axis A and a second polarizer 14b provided on the other side (the front face side) of the liquid crystal layer 10 having a second polarization axis B parallel to the first polarization axis A. In other words, the first polarizer 14a and the second polarizer 14b are in a parallel nicols arrangement. Further, the term "parallel" mentioned here includes a state in which the first polarization axis A and the second polarization axis B are substantially parallel within the range of a design error of the display panel 1 as well as a state in which the first polarization axis A and the second polarization axis B are geometrically parallel.

The glass substrates 13 are transparent substrates with insulation properties. The glass substrates 13 include the first glass substrate 13a (a first substrate) disposed between the liquid crystal layer 10 and the first polarizer 14a, and a second glass substrate 13b (a second substrate) disposed between the liquid crystal layer 10 and the second polarizer 14b. That is, the liquid crystal layer 10 is sandwiched by the first glass substrate 13a and the second glass substrate 13b. The first electrode 31 and the second electrode 32 are provided on the surfaces of each of the first glass substrate 13a and the second glass substrate 13b on the liquid crystal layer 10 side, respectively. The first electrode 31 and the second electrode 32 may be formed of a transparent conductive material, for example, indium tin oxide (ITO). In addition, the first glass substrate 13a and the second glass substrate 13b include an alignment film (not illustrated) that is a thin film for controlling alignment of the liquid crystal molecules. The alignment film has been subjected to an alignment treatment to align the liquid crystal molecules 10a in a predetermined direction (a pre-tilt direction). The alignment treatment performed on the alignment film includes, for example, a rubbing treatment or a photo-alignment treatment.

In the see-through window display 100 according to the first embodiment, the display panel 1 is disposed in a parallel nicols arrangement in which the polarization axes of the facing first polarizer 14a and second polarizer 14b are parallel to each other as described above.

In addition, the see-through window display 100 has a normally white characteristic as will be described below as shown in FIG. 3. That is, when a voltage applied to the liquid crystal layer 10 of the display panel 1 from the drive circuit unit 6 (hereinafter, referred to as applied voltage) is the minimum voltage in the drive voltage range, the light transmittance becomes the highest (transmittance TW). Thus, the state in which the transmittance is TW is referred to as the transparent display state. Conversely, the see-through window display 100 has the lowest light transmittance (the transmittance TB) when the applied voltage is the maximum voltage in the drive voltage range. The state in which the transmittance is TB is referred to as the image display state.

The above-described normally white characteristic can define a configuration of the display panel 1 as follows, for example. First, it is assumed that an axis parallel to the axis obtained by rotating the first polarization axis A 45 degrees clockwise is referred to as an a-axis, and an axis parallel to the axis obtained by rotating the first polarization axis A 45 degrees counterclockwise is referred to as a b-axis. It is assumed that an a-axis component of the refractive index of the liquid crystal layer 10 is na, and a b-axis component is nb. It is assumed that a value of anisotropy of refractive index of the liquid crystal layer 10 that is the difference between the refractive index of the a-axis component and the refractive index of the b-axis component is $\Delta n = |na - nb|$.

Under the conditions set as described above, the display panel 1 has a value of $\Delta n$ when the applied voltage is lower than or equal to the threshold voltage, which is smaller than a value of $\Delta n$ when the applied voltage is higher than the threshold voltage. Specifically, the display panel 1 has the value of $\Delta n$ when the applied voltage is lower than or equal to the threshold voltage, which is about 0, for example, 0.02 or less.

Here, in the parallel nicols arrangement, the transmittance of the liquid crystal layer 10 greatly changes when incident light is a plane wave along the a-axis and the b-axis. Furthermore, the relationship that the value of $\Delta n$ gets close to 0 as the transmittance of the liquid crystal layer 10 gets closer to 100%, and conversely, the value of $\Delta n$ becomes greater as the transmittance decreases further is satisfied.

In the display panel 1, the value of $\Delta n$ is smaller when the applied voltage is lower than or equal to the threshold voltage than when the applied voltage is higher than the threshold voltage, and the value of $\Delta n$ is approximately zero.

Further, it is possible to define that the display panel 1 has a normally white characteristic as follows. That is, in addition to the conditions set as described above, it is assumed that the thickness of the liquid crystal layer 10 is d, and a phase difference of the liquid crystal layer 10 is $d\Delta n$. Here, the relationship that the phase difference ($d\Delta n$) of light transmitted through the liquid crystal layer 1 approaches zero when the transmittance of the liquid crystal layer 10 is close to 100%, and conversely, the phase difference ($d\Delta n$) of light transmitted through the liquid crystal layer 10 increases when the transmittance of the liquid crystal layer 10 decreases is satisfied.

In the display panel 1, when the applied voltage is lower than or equal to the threshold voltage, $d\Delta n$ is 50 nm or less, and preferably 0 nm. Thus, it can be said that the display panel 1 has a normally white characteristic with which the transmittance increases when the applied voltage is lower than or equal to the threshold voltage.

Thus, in the see-through window display 100 according to the first embodiment, light transmitted through the liquid crystal layer 10 when the applied voltage is lower than or equal to the threshold voltage in the display panel 1 can be prevented from becoming birefringent and scattered. Thus, when the see-through window display 100 is in the transparent display state, it is possible to prevent a background on the back face side of the display panel 1 from being visually recognized in a blurred state. In addition, because the drive circuit unit 6 applies only the minimum voltage in the drive voltage range to the display panel 1 to cause only a background of the see-through window display 100 to be viewed by a viewer, consumption of power can be reduced.

Incidentally, the drive mode of the display panel 1 is a vertical alignment (VA) mode in the see-through window display 100 according to the first embodiment. A pixel electrode serving as the first electrode 31 is provided on the first glass substrate 13a side and a common electrode serving as the second electrode 32 is provided on the second glass substrate 13b side, and an electrical field is imparted to be perpendicular to the main surface of the liquid crystal layer 10 from the first glass substrate 13a toward the second glass substrate 13b. Further, the display panel 1 is in a state of uniform alignment of the liquid crystal molecules 10a when the applied voltage is lower than or equal to the threshold voltage.

Figure 7:
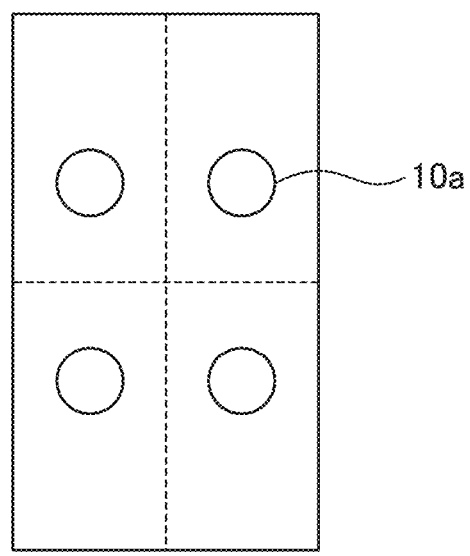
FIG. 7 is a diagram schematically illustrating an alignment state of a plurality of liquid crystal molecules corresponding to one pixel when an applied voltage is lower than or equal to a threshold voltage in the display panel illustrated in FIG. 5.

Specifically, the liquid crystal layer 10 of the display panel 1 includes the liquid crystal molecules 10a having negative anisotropy of dielectric constant (negative liquid crystal molecules). In other words, the liquid crystal layer 10 is used as a negative nematic liquid crystal. When the applied voltage is lower than or equal to the threshold voltage, a plurality of liquid crystal molecules 10a are aligned such that the long axis direction thereof is perpendicular to the in-plane direction of the liquid crystal layer 10 as illustrated in FIG. 7. FIG. 7 is a diagram schematically illustrating an alignment state of a plurality of liquid crystal molecules 10a corresponding to one pixel when the applied voltage is lower than or equal to the threshold voltage in the display panel 1 illustrated in FIG. 5. In FIG. 7, the alignment state of the liquid crystal molecules 10a when viewed in a direction perpendicular to the main surface of the liquid crystal layer 10 is illustrated.

Figure 8:
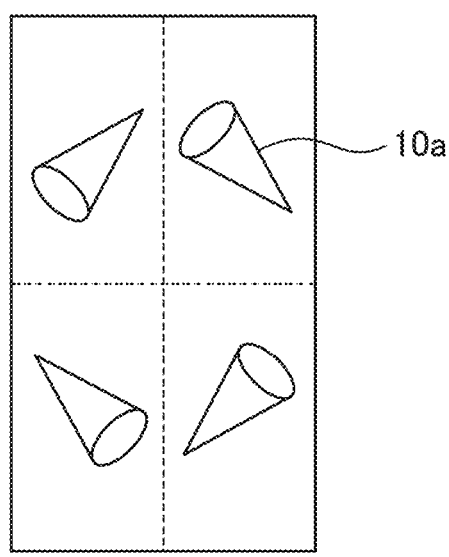
FIG. 8 is a diagram schematically illustrating an alignment state of a plurality of liquid crystal molecules corresponding to one pixel when a voltage having a value higher than the threshold voltage is applied to the display panel illustrated in FIG. 5.

On the other hand, when the applied voltage is higher than the threshold voltage, each of the plurality of liquid crystal molecules 10a is aligned such that the long axis thereof is in a direction substantially parallel to the in-plane direction of the liquid crystal layer 10 as illustrated in FIG. 8. FIG. 8 is a diagram schematically illustrating an alignment state of a plurality of liquid crystal molecules 10a corresponding to one pixel when a voltage having a value higher than the threshold voltage is applied to the display panel 1 illustrated in FIG. 5. In FIG. 8, the alignment state of the liquid crystal molecules 10a when viewed in a direction perpendicular to the main surface of the liquid crystal layer 10 as in FIG. 7 is illustrated. In FIG. 8 and FIG. 7 described above, the liquid crystal molecules 10a are illustrated as having a conical shape for convenience. The long axis directions of the liquid crystal molecules 10a are the directions of the cone heights.

Further, in FIGS. 7 and 8, a multi-domain vertical alignment (MVA) mode in which one pixel is divided into four domains is illustrated as an example of the VA mode. Specifically, in the MVA mode, the liquid crystal molecules 10a of the liquid crystal layer 10 can have different alignment states for each of partition ranges obtained by partitioning one pixel into four. Because the display panel 1 can have varying alignment states of the liquid crystal molecules 10a for each of the partition ranges in this manner, the viewing angle of the display panel 1 can be widened.

Further, the display panel 1 is in a state of a uniform alignment of the plurality of liquid crystal molecules 10a when the applied voltage is lower than or equal to the threshold voltage. For this reason, the liquid crystal layer 10 has a uniform refractive index. In addition, light incident perpendicularly to the panel surface of the display panel 1 is transmitted through the display panel 1 with almost no refraction. Thus, when a viewer views the exhibit 5 on the back face side of the display panel 1 when the applied voltage applied to the liquid crystal layer 10 is lower than or equal to the threshold voltage, it is possible to prevent the exhibit 5 from appearing in a blurry state.

Figure 9:
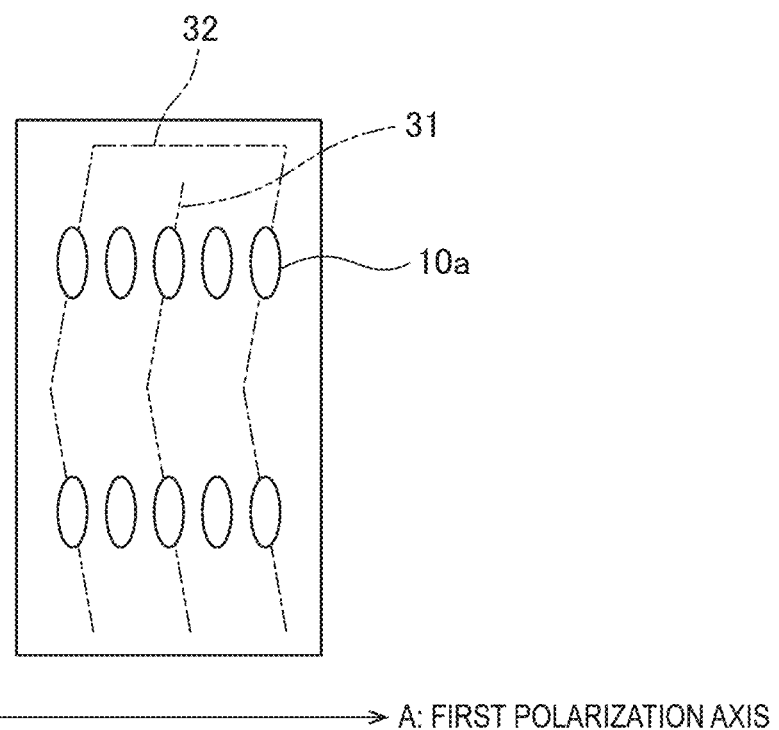
FIG. 9 is a diagram schematically illustrating an alignment state of a plurality of liquid crystal molecules in an IPS mode when an applied voltage is lower than or equal to the threshold voltage in the display panel illustrated in FIG. 5.
Figure 10:
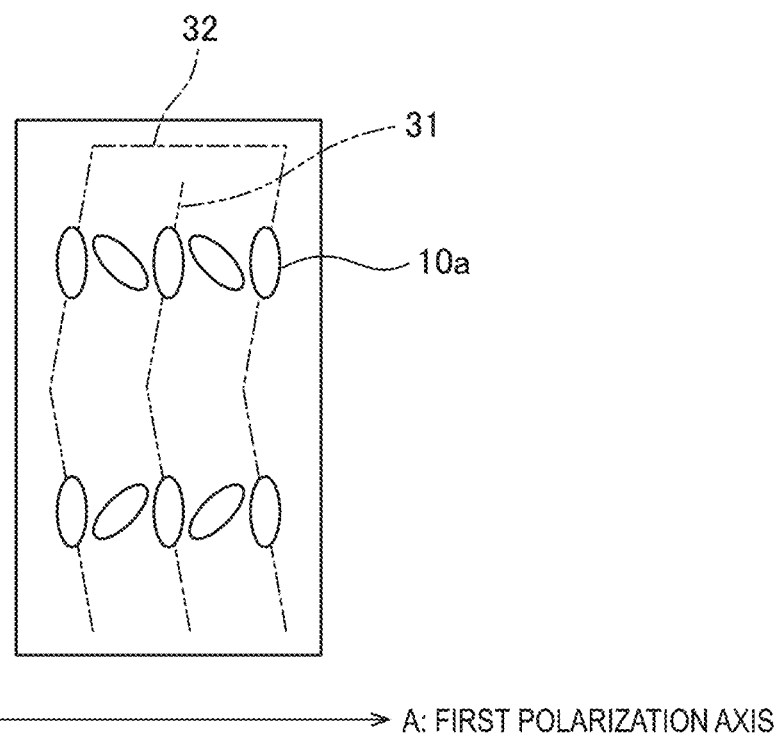
FIG. 10 is a diagram schematically illustrating an alignment state of a plurality of liquid crystal molecules in the IPS mode when an applied voltage is higher than the threshold voltage in the display panel illustrated in FIG. 5.
Figure 11:
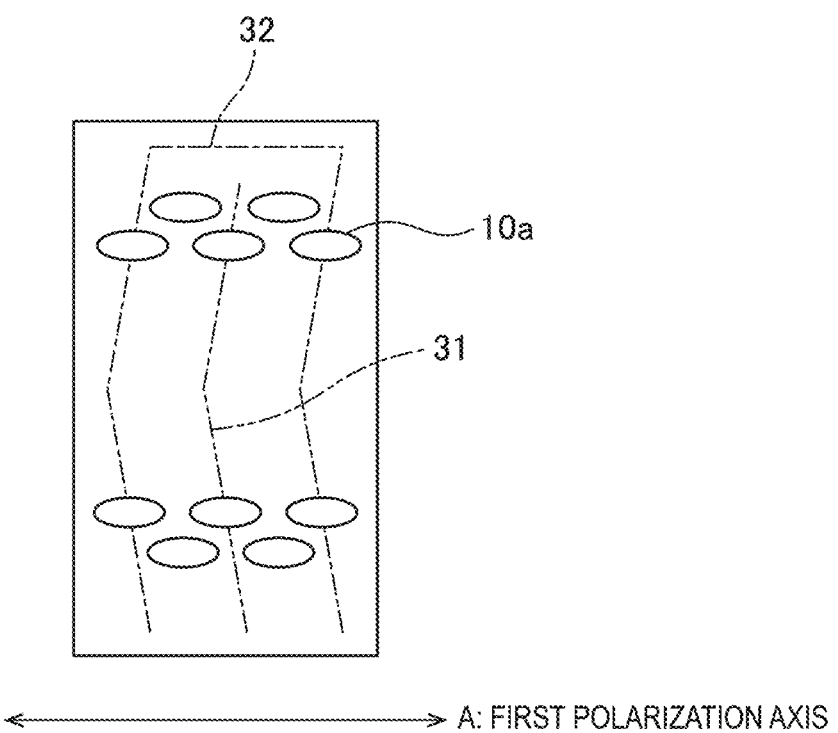
FIG. 11 is a diagram schematically illustrating an alignment state of a plurality of liquid crystal molecules in the IPS mode when an applied voltage is lower than or equal to the threshold voltage in the display panel illustrated in FIG. 5.
Figure 12:
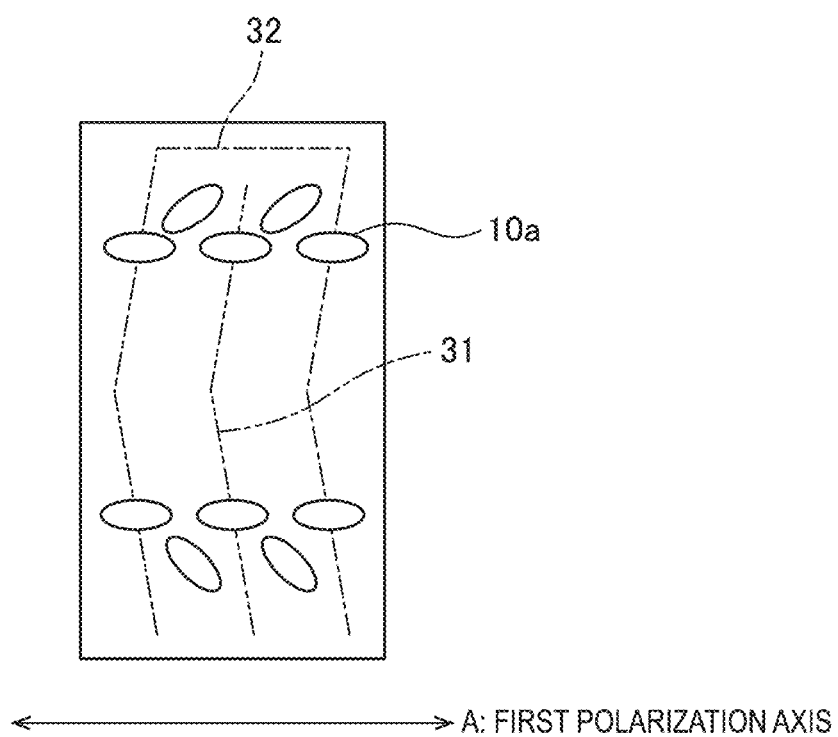
FIG. 12 is a diagram schematically illustrating an alignment state of a plurality of liquid crystal molecules in the IPS mode when an applied voltage is higher than the threshold voltage in the display panel illustrated in FIG. 5.

Further, although the configuration in which the drive mode of the display panel 1 is the VA mode has been described above, it is not limited thereto. For example, the drive mode of the display panel 1 may be an in-plane switching (IPS) mode. When the drive mode is the IPS mode as illustrated in FIGS. 9 to 12, the display panel 1 is provided with the first electrode 31 (a pixel electrode) serving as a pixel electrode and the second electrode 32 (a counter electrode) serving as a common electrode on the first glass substrate 13a, and an electrical field is imparted parallel to the in-plane direction of the first glass substrate 13a. FIGS. 9 and 11 are diagrams schematically illustrating alignment states of a plurality of liquid crystal molecules 10a in the IPS mode when the applied voltage is lower than or equal to the threshold voltage in the display panel 1 illustrated in FIG. 5. FIGS. 10 and 12 are diagrams schematically illustrating alignment states of a plurality of liquid crystal molecules 10a in the IPS mode when the applied voltage is higher than the threshold voltage in the display panel 1 illustrated in FIG. 5. In FIGS. 9 to 12, the alignment states of the plurality of liquid crystal molecules 10a when viewed in a perpendicular direction with respect to the main surface of the liquid crystal layer 10 are illustrated. In FIGS. 9 to 12, the liquid crystal molecules 10a are illustrated as having an elliptical shape for convenience. Further, the long axis direction of the liquid crystal molecules 10a is the long axis direction of the ellipses. Additionally, in FIGS. 9 to 12, the first electrode 31 provided on the first glass substrate 13a is schematically indicated by two-dot chain lines, and the second electrode 32 is schematically indicated by single-dot chain lines. That is, the first electrode 31 is disposed to extend upward and downward at the center, and the second electrode 32 is disposed in a U shape to surround the first electrode 31 as illustrated in FIGS. 9 to 12.

In FIGS. 9 and 10, the alignment states of the plurality of liquid crystal molecules 10a in a case of positive-type liquid crystal are illustrated. That is, when the applied voltage is lower than or equal to the threshold voltage, the plurality of liquid crystal molecules 10a are aligned such that they are parallel to the in-plane direction of the liquid crystal layer 10 and the long axis thereof is substantially perpendicular to the first polarization axis A. That is, the plurality of liquid crystal molecules 10a are uniformly aligned with the long axis oriented in the perpendicular direction of the paper surface as illustrated in FIG. 9. In addition, when a voltage higher than the threshold voltage is applied, the long axis of the liquid crystal molecules 10a disposed between the first electrode 31 and the second electrode 32 is tilted in the left-right direction on the paper surface as illustrated in FIG. 10.

In addition, in FIGS. 11 and 12, the alignment states of the plurality of liquid crystal molecules 10a in a case where the liquid crystal layer 10 is a negative liquid crystal are illustrated. That is, when the applied voltage is lower than or equal to the threshold voltage, the plurality of liquid crystal molecules 10a are aligned such that they are parallel to the in-plane direction of the liquid crystal layer 10 and the long axis thereof is substantially parallel to the first polarization axis A. That is, the plurality of liquid crystal molecules 10a are uniformly aligned with the long axis of each of the liquid crystal molecules 10a oriented in the left-right direction as illustrated in FIG. 11. In addition, when a voltage higher than the threshold voltage is applied, the long axis of the liquid crystal molecules 10a disposed between the first electrode 31 and the second electrode 32 is tilted in the perpendicular direction as illustrated in FIG. 12.

When the applied voltage is lower than or equal to the threshold voltage as described above, no electrical field affects the liquid crystal molecules 10a. Therefore, the alignment of the plurality of liquid crystal molecules 10a remains in the initial alignment in which the liquid crystal molecules are uniformly aligned. For this reason, the liquid crystal layer 10 has a uniform refractive index. In addition, light incident perpendicularly to the panel surface of the display panel 1 is transmitted through the display panel 1 with almost no refraction. Thus, when a viewer visually recognizes the exhibit 5 on the back face side of the display panel 1 when the applied voltage applied to the liquid crystal layer 10 is lower than or equal to the threshold voltage, it is possible to prevent the exhibit 5 from appearing in a blurry state.

Figure 13:
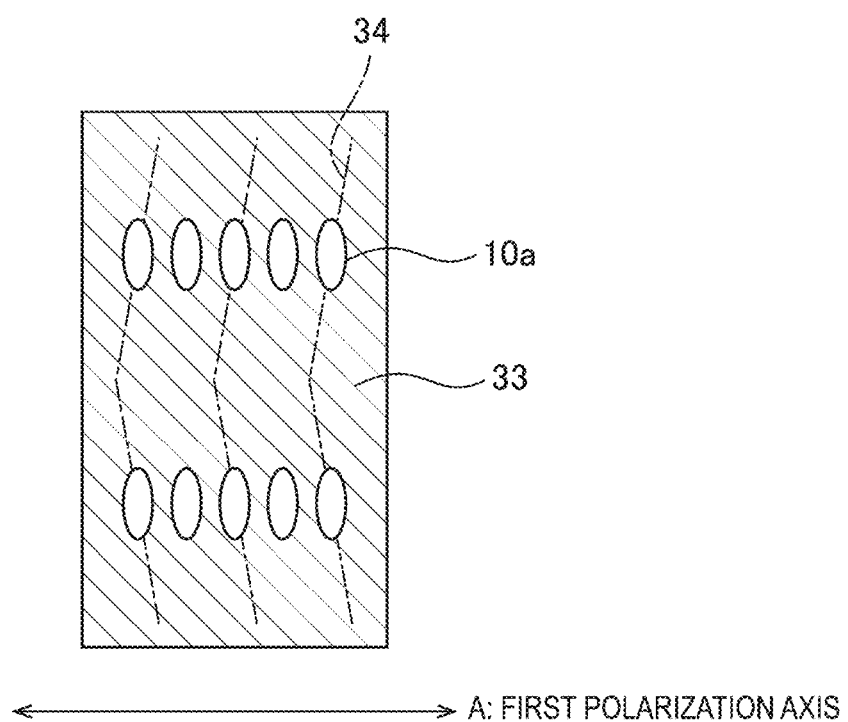
FIG. 13 is a diagram schematically illustrating an alignment state of a plurality of liquid crystal molecules in an FFS mode when an applied voltage is lower than or equal to the threshold voltage in the display panel illustrated in FIG. 5.
Figure 14:
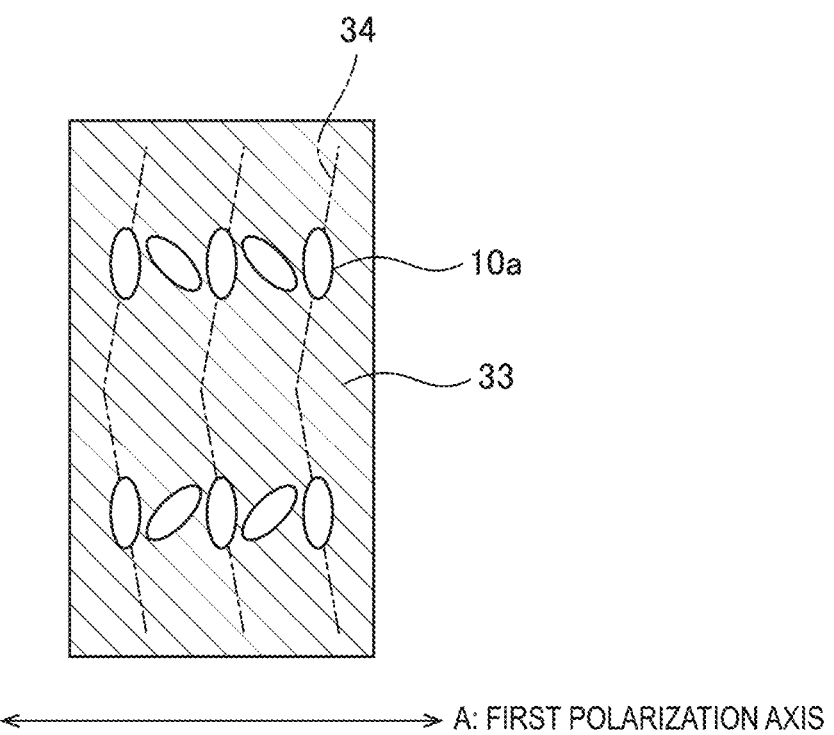
FIG. 14 is a diagram schematically illustrating an alignment state of a plurality of liquid crystal molecules in the FFS mode when an applied voltage is higher than the threshold voltage in the display panel illustrated in FIG. 5.
Figure 15:
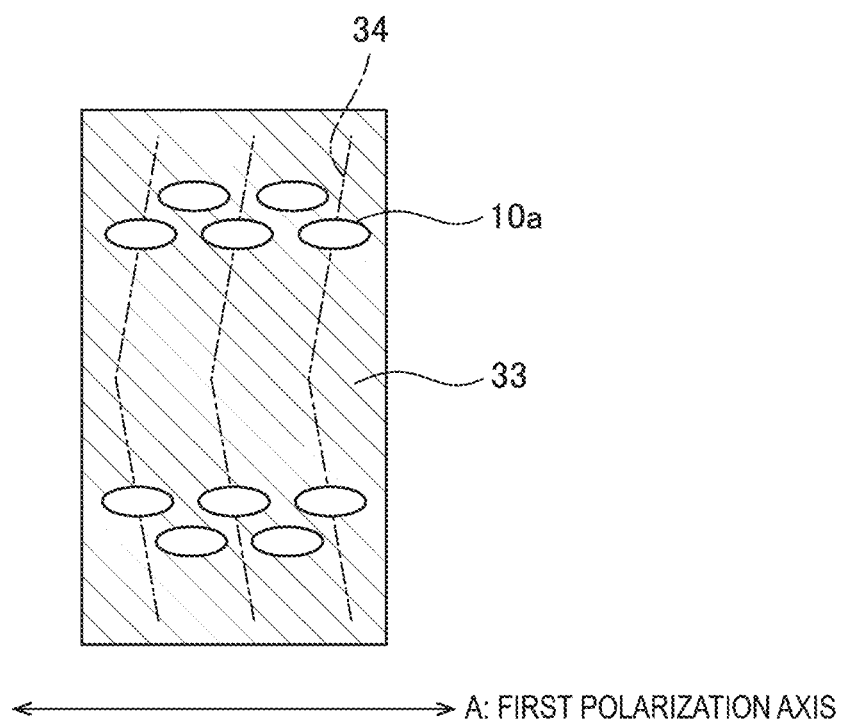
FIG. 15 is a diagram schematically illustrating an alignment state of a plurality of liquid crystal molecules in the FFS mode when an applied voltage is lower than or equal to the threshold voltage in the display panel illustrated in FIG. 5.
Figure 16:
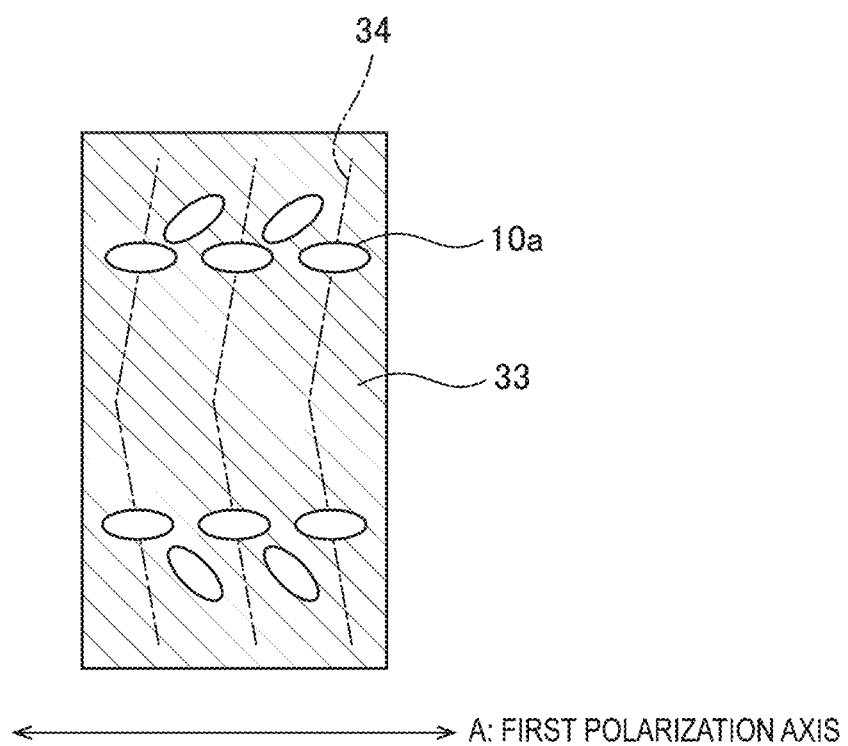
FIG. 16 is a diagram schematically illustrating an alignment state of a plurality of liquid crystal molecules in the FFS mode when an applied voltage is higher than the threshold voltage in the display panel illustrated in FIG. 5.

The drive mode of the display panel 1 may be another mode that is a variation of the IPS mode. Another mode of the drive mode may include, for example, a fringe-field switching (FFS) mode. When the drive mode is the FFS mode as illustrated in FIGS. 13 to 16, the display panel 1 may have a solid electrode 33 disposed on the first glass substrate 13a and an insulating layer (not illustrated) disposed on the solid electrode 33. Data electrodes 34 are further disposed on the insulating layer. FIGS. 13 and 15 are diagrams schematically illustrating the alignment states of the plurality of liquid crystal molecules 10a in the FFS mode when the applied voltage is lower than or equal to a threshold voltage in the display panel 1 illustrated in FIG. 5. FIGS. 14 and 16 are diagrams schematically illustrating the alignment states of the plurality of liquid crystal molecules 10a in the FFS mode when the applied voltage is higher than the threshold voltage in the display panel 1 illustrated in FIG. 5. In FIGS. 13 to 16, the alignment states of the liquid crystal molecules 10a when viewed in a direction perpendicular to the main surface of the liquid crystal layer 10 are illustrated. In FIGS. 13 to 16, the liquid crystal molecules 10a are illustrated as having an elliptical shape for convenience. Further, the long axis direction of the liquid crystal molecules 10a is the long axis direction of the ellipses. Additionally, in FIGS. 13 to 16, the solid electrode 33 provided on the first glass substrate 13a is indicated by hatching, and the data electrodes 34 are schematically indicated by single-dot chain lines. That is, the plurality of data electrodes 34 (three data electrodes 34 in FIGS. 13 to 16) are disposed in a V shape on the solid electrode 33 as illustrated in FIGS. 13 to 16.

In the FFS mode, an electrical field is imparted in parallel with the in-plane direction of the first glass substrate 13a as in the IPS mode. However, because a voltage is applied to the solid electrode 33 via the insulating layer from the data electrodes 34, no voltage is applied to the liquid crystal molecules 10a on the data electrodes 34. For this reason, even when a voltage exceeding the threshold voltage is applied to the liquid crystal layer 10, the liquid crystal molecules 10a on the data electrodes 34 do not change.

In FIGS. 13 and 14, the alignment states of the plurality of liquid crystal molecules 10a in a case where the liquid crystal layer 10 is a positive liquid crystal are illustrated. That is, when the applied voltage is lower than or equal to the threshold voltage, the plurality of liquid crystal molecules 10a are aligned such that they are parallel to the in-plane direction of the liquid crystal layer 10 and the long axis thereof is substantially perpendicular to the first polarization axis A. That is, the plurality of liquid crystal molecules 10a are uniformly aligned with the long axis oriented in the perpendicular direction as illustrated in FIG. 13. In addition, when a voltage higher than the threshold voltage is applied, although the alignment state of the liquid crystal molecules 10a disposed on the data electrodes 34 does not change as illustrated in FIG. 14, the long axis of the liquid crystal molecules 10a between the different data electrodes 34 are tilted in the left-right direction.

In addition, in FIGS. 15 and 16, the alignment states of the plurality of liquid crystal molecules 10a in a case where the liquid crystal layer 10 is a negative liquid crystal are illustrated. That is, when the applied voltage is lower than or equal to the threshold voltage, the plurality of liquid crystal molecules 10a are aligned such that they are parallel to the in-plane direction of the liquid crystal layer 10 and the long axis thereof is substantially parallel to the first polarization axis A. That is, the plurality of liquid crystal molecules 10a are uniformly aligned with the long axis oriented in the left-right direction as illustrated in FIG. 15. In addition, when a voltage higher than the threshold voltage is applied, although the alignment state of the liquid crystal molecules 10a disposed on the data electrodes 34 does not change as illustrated in FIG. 16, the long axis of the liquid crystal molecules 10a between the different data electrodes 34 is tilted in the perpendicular direction.

When the applied voltage is lower than or equal to the threshold voltage as described above, no electrical field affects the liquid crystal molecules 10a. Therefore, the alignment state of the plurality of liquid crystal molecules 10a remains in the initial alignment in which the liquid crystal molecules 10a are uniformly aligned. For this reason, the liquid crystal layer 10 has a uniform refractive index. In addition, light incident perpendicularly to the panel surface of the display panel 1 is transmitted through the display panel 1 with almost no refraction.

As described above, in the see-through window display 100 according to the first embodiment, the display panel 1 has a structure having a normally white characteristic in which the transmittance is highest when the applied voltage is lower than or equal to the threshold voltage.

Thus, in the see-through window display 100 according to the first embodiment, light transmitted through the liquid crystal layer 10 when the applied voltage is lower than or equal to the threshold voltage in the display panel 1 can be prevented from becoming birefringent and scattered.

Thus, when the see-through window display 100 according to the first embodiment is in the transparent display state, it is possible to prevent a background on the back face side of the display panel 1 from appearing in a blurred state. In addition, consumption of power caused by the application of a voltage when a viewer is made to view only a background of the see-through window display 100 can be reduced.

First Modified Example

Next, a configuration of a see-through window display 100 according to a first modified example of the first embodiment of the disclosure will be described. The see-through window display 100 according to the first modified example of the first embodiment has a configuration in which the contrast ratio can be further improved in the image display state, compared with the configuration of the see-through window display 100 according to the first embodiment. The see-through window display 100 according to the first modified example of the first embodiment has a similar configuration to that of the see-through window display 100 according to the first embodiment except that the configuration of the display panel 1 has been deliberated to improve the contrast ratio. Thus, similar constituent members are denoted by the same reference signs and descriptions thereof are omitted.

In the display panel 1 according to the first embodiment, the first polarizer 14a and the second polarizer 14b are disposed in a parallel nicols arrangement. Furthermore, the display panel 1 has a normally white characteristic in which the transmittance has a maximum value when the applied voltage is lower than or equal to the threshold voltage, resulting in white display. The display panel 1 having a normally white characteristic as described has a smaller contrast ratio without having a luminance decreasing when black display is performed in the image display state, compared with a display panel having normally black characteristics. For example, if the contrast ratio of the former case is assumed to be approximately 4000, the contrast ratio of the latter case is approximately 10.

The reason for a lower contrast ratio when the display panel 1 has a normally white characteristic is that black display is performed with light transmitted through the liquid crystal layer 10 showing birefringence. In order to perform black display with light transmitted through the liquid crystal layer 10 showing birefringence, a condition for Equation (1) below needs to be satisfied when the retardation of the display panel 1 is set to Re (nm) and the wavelength of light is set to λ (nm).

$$Re = \lambda/2 \quad (1)$$

That is, when the retardation Re of the display panel 1 corresponding to each wavelength $\lambda_i$ of light matches the condition ($\lambda/2$) for black display defined for each wavelength $\lambda_i$ of light, the luminance of light of the wavelength $\lambda_i$ is minimum. The point of the minimum luminance is referred to as a luminance bottom of light of the wavelength $\lambda_i$. In other words, the condition for black display defined for each wavelength $\lambda_i$ of light is a value of retardation of the liquid crystal layer 10 in which the transmittance is zero in a configuration of the liquid crystal layer 10 sandwiched between the first polarizer 14a and the second polarizer 14b, and is determined by the relationship between a polarization state of light transmitted through the liquid crystal layer 10 and the second polarization axis B of the second polarizer 14b.

However, it is difficult to set the display panel 1 to satisfy the condition of Equation (1) with respect to light of all wavelengths. Thus, a configuration in which Equation (1) is satisfied with respect to light of one wavelength (for example, light of the wavelength of G among R, G, and B) is conceivable.

Here, in a case where the display panel 1 is set to satisfy Equation (1) with respect to light of the wavelength of G, the display panel 1 is not capable of satisfying the condition of Equation (1) with respect to light of the wavelength of R and light of the wavelength of B. Thus, when black display is performed, leakage of light of a wavelength other than the wavelength of G (e.g., light of the wavelength of R and light of the wavelength of B) from the display panel 1 may occur.

That is, when an amount of light leakage from the display panel 1 that occurs when black display is performed is set to T, T has a proportional relationship expressed by Relationship (2) below.

$$T \alpha \sin^2(2\pi(Re/\lambda)) \quad (2)$$

In a case where Equation (1) is satisfied with respect to light of a certain wavelength, the amount of light leakage of light of the wavelength satisfies T=0. However, in a case where the condition of Equation (1) is not satisfied with respect to other wavelengths, the value of the amount of light leakage T from the display panel 1 increases.

In this way, if Equation (1) is satisfied for light of one wavelength in display panel 1, the value of light leakage amount T increases in display panel 1 and the contrast ratio decreases.

Thus, in the see-through window display 100 according to the first modified example of the first embodiment, a configuration of the color filter 12 is devised such that each of light of the wavelength of R, light of the wavelength of G, and light of the wavelength of B has the luminance bottom when black display is performed.

Specifically, the see-through window display 100 according to the first modified example of the first embodiment has a cell thickness of the liquid crystal layer 10 that can be adjusted by devising the film thickness of each of the red optical filter film 20, the green optical filter film 21, and the blue optical filter film 22 constituting the color filter 12. In addition, it is configured such that light of the wavelength of R transmitted through the red optical filter film 20, light of the wavelength of G transmitted through the green optical filter film 21, and light of the wavelength of B transmitted through the blue optical filter film 22 can have the luminance bottom within the range of the drive voltage of the display panel 1.

Figure 17:
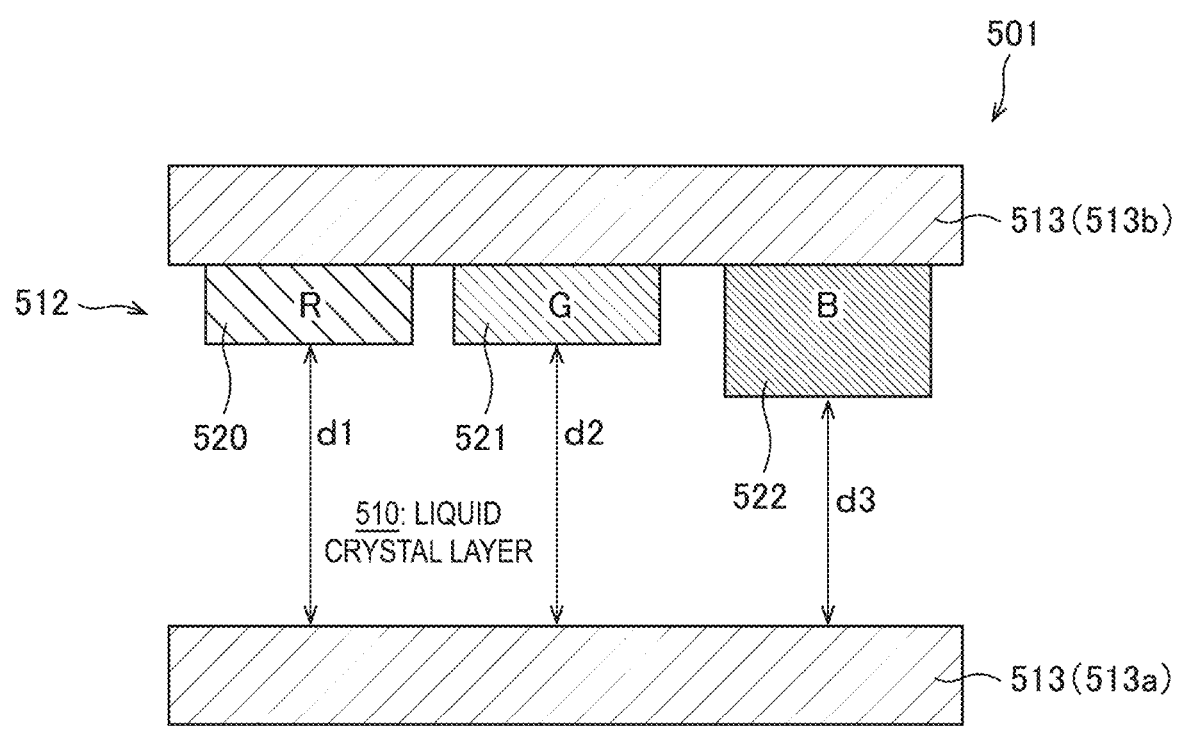
FIG. 17 is a cross-sectional view schematically illustrating a configuration of a liquid crystal layer and a color filter included in a display panel according to a Comparative Example of the first embodiment of the present invention.

First, a configuration of a display panel 501 including a color filter 512 that is used generally as a Comparative Example will be described with reference to FIG. 17 here. FIG. 17 is a cross-sectional view schematically illustrating a configuration of a liquid crystal layer 510 and the color filter 512 included in the display panel 501 according to a Comparative Example of the first embodiment of the present invention.

In the display panel 501 according to the Comparative Example, the color filter 512 is configured such that a red optical filter film 520 and a green optical filter film 521 have an equal film thickness, and a film thickness of a blue optical filter film 522 is greater than the film thickness of the red optical filter film 520 and the green optical filter film 521 as illustrated in FIG. 17. In other words, in the liquid crystal layer 510, the cell thicknesses d1 and d2 of the regions corresponding to each of the red optical filter film 520 and the green optical filter film 521 are equal. In addition, in the liquid crystal layer 510, a cell thickness d3 of the region corresponding to the blue optical filter film 522 is smaller than the cell thicknesses d1 and d2 of the regions corresponding to each of the red optical filter film 520 and the green optical filter film 521.

Here, the display panel 501 with the color filter 512 as illustrated in FIG. 17 was prepared, and a voltage in the range from 4 V to 10 V was experimentally applied to the liquid crystal layer 10 to investigate the correlations between luminance values of light transmitted through the red optical filter film 520, the green optical filter film 521, and the blue optical filter film 522 and voltages (voltage-luminance characteristics). Furthermore, the voltage-luminance characteristics were investigated with the display panel driven in the MVA mode at the different cell thicknesses d1, d2, and d3. As a result, the graph shown in FIG. 18 was obtained.

Figure 18:
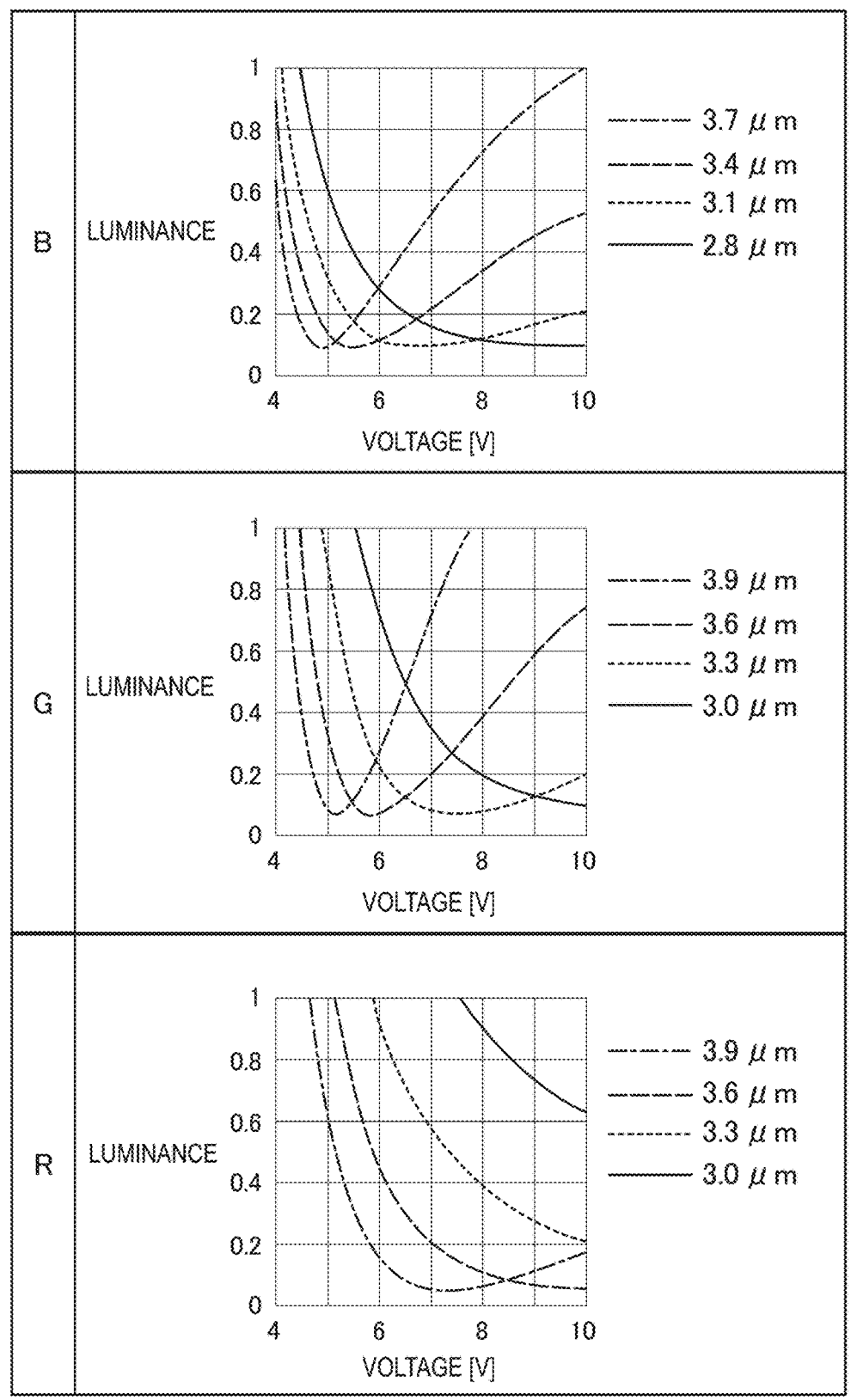
FIG. 18 is a table collectively showing graphs of correlations between luminance values of light of the wavelength of R, light of the wavelength of G, and light of the wavelength of B and voltages when a voltage is applied to the liquid crystal layer using the color filter illustrated in FIG. 17.

FIG. 18 is a table collectively showing graphs of correlations between luminance values of light of the wavelength of R, light of the wavelength of G, and light of the wavelength of B and voltages when a voltage is applied to the liquid crystal layer 510 using the color filter 512 illustrated in FIG. 17. In FIG. 18, the voltage-luminance characteristics of light of the wavelength R, the voltage-luminance characteristics of light of the wavelength of G, and the voltage-luminance characteristics of light of the wavelength of B are shown in order from the bottom. In each graph shown in FIG. 18, the vertical axis indicates luminance value, and the horizontal axis indicates applied voltage.

Additionally, in the graph of light of the wavelength of R in FIG. 18, the solid line indicates voltage-luminance characteristics when the cell thickness d1 is 3.0 μm, the dashed line indicates voltage-luminance characteristics when the cell thickness d1 is 3.3 μm, the long dashed line indicates voltage-luminance characteristics when the cell thickness d1 is 3.6 μm, and the one-dot chain line indicates voltage-luminance characteristics when the cell thickness d1 is 3.9 μm.

In the graph of light of the wavelength of G in FIG. 18, the solid line indicates voltage-luminance characteristics when the cell thickness d2 is 3.0 μm, the dashed line indicates voltage-luminance characteristics when the cell thickness d2 is 3.3 μm, the long dashed line indicates voltage-luminance characteristics when the cell thickness d2 is 3.6 μm, and the one-dot chain line indicates voltage-luminance characteristics when the cell thickness d2 is 3.9 μm.

In the graph of light of the wavelength of B in FIG. 18, the solid line indicates voltage-luminance characteristics when the cell thickness d3 is 2.8 μm, the dashed line indicates voltage-luminance characteristics when the cell thickness d3 is 3.1 μm, the long dashed line indicates voltage-luminance characteristics when the cell thickness d3 is 3.4 μm, and the one-dot chain line indicates voltage-luminance characteristics when the cell thickness d3 is 3.7 μm.

It has been ascertained that, when each of the cell thickness d1, the cell thickness d2, and the cell thickness d3 is varied as shown in FIG. 18, the position at which the luminance bottom appears varies with respect to light of the wavelength of R, light of the wavelength of G, and light of the wavelength of B. That is, it has been ascertained that, by controlling each of the cell thicknesses d1, d2, and d3, a condition that the luminance value of each of light of the wavelength of R, light of the wavelength of G, and light of the wavelength of B has a minimum value (luminance bottom) can be controlled.

In addition, it has been ascertained that, as each of the cell thicknesses d1, d2, and d3 becomes greater, an applied voltage necessary for setting the luminance value of each of light of the wavelength of R, light of the wavelength of G, and light of the wavelength of B to the luminance bottom becomes lower. Further, no luminance bottom appeared for light of the wavelength of R within the range of the drive voltage, except when the cell thickness was 3.9 μm.

Additionally, the luminance value of each of light of the wavelength of R, light of the wavelength of G, and light of the wavelength of B was not zero even though the point thereof was the luminance bottom as shown in FIG. 18. This is because, even though the above-described correlation of each of light transmitted through the red optical filter film 520, the green optical filter film 521, and the blue optical filter film 522 was investigated, each light was mixed with light of different wavelengths.

As described above, it has been ascertained that it is preferable to configure the color filter 12 such that the luminance bottoms appear within the range of the drive voltage and each of the cell thickness d1, the cell thickness d2, and the cell thickness d3 is reduced as much as possible. From the results of this Comparative Example, in the see-through window display 100 according to the first modified example of the first embodiment, the color filter 12 included in the display panel 1 may be configured as follows.

In other words, the display panel 1 includes the color filter 12 including the red optical filter film 20 that transmits light corresponding to the wavelength range of red subpixels, the green optical filter film 21 that transmits light corresponding to the wavelength range of green subpixels, and the blue optical filter film 22 that transmits light corresponding to the wavelength range of blue subpixels.

Figure 19:
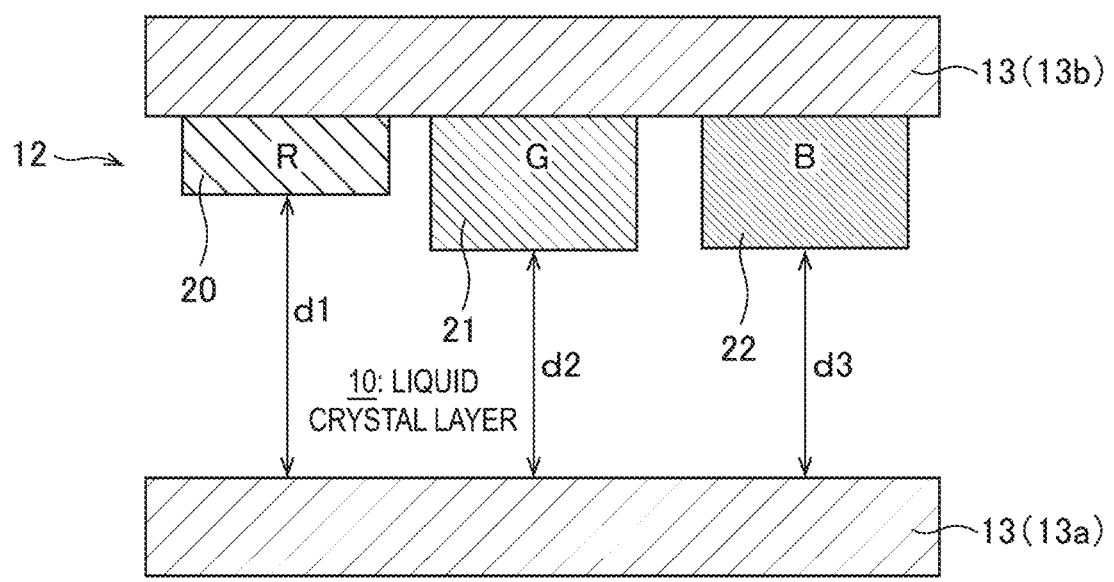
FIG. 19 is a cross-sectional view schematically illustrating a configuration of a liquid crystal layer and a color filter included in a display panel according to a first modified example of the first embodiment of the present invention.

In addition, the color filter 12 is configured such that the film thickness of the red optical filter film 20 is thinner than the film thickness of each of the blue optical filter film 22 and the green optical filter film 21, and the difference between the film thickness of the green optical filter film 21 and the film thickness of the blue optical filter film 22 is less than or equal to half of the difference between the film thickness of the red optical filter film 20 and the film thickness of the blue optical filter film 22 as illustrated in FIG. 19.

FIG. 19 is a cross-sectional view schematically illustrating a configuration of the liquid crystal layer 10 and the color filter 12 included in the display panel 1 according to the first modified example of the first embodiment of the present invention. The liquid crystal layer 10 is provided between the first glass substrate 13a and the second glass substrate 13b as illustrated in FIG. 19. Additionally, a color filter 12 is disposed on a major surface of the second glass substrate 13b on the liquid crystal layer 10 side.

In the example illustrated in FIG. 19, the film thickness of the green optical filter film 21 and the film thickness of the blue optical filter film 22 are equal, and the film thickness of the red optical filter film 20 is smaller than the film thickness of each of the green optical filter films 21 and the blue optical filter film 22.

In other words, the color filter 12 has a cell thickness d1 of the liquid crystal layer 10 corresponding to the red optical filter film 20 thicker than cell thicknesses d2 and d3 of the liquid crystal layer 10 corresponding to each of the green optical filter film 21 and the blue optical filter film 22. In addition, the difference between the cell thickness d2 of the liquid crystal layer 10 corresponding to the green optical filter film 21 and the cell thickness d3 of the liquid crystal layer 10 corresponding to the blue optical filter film 22 is configured to be less than or equal to half of the difference between the cell thickness d1 of the liquid crystal layer 10 corresponding to the red optical filter film 20 and the cell thickness d3 of the liquid crystal layer 10 corresponding to the blue optical filter film 22. Further, in the example illustrated in FIG. 19, the difference between the cell thickness d1 and the cell thickness d2 is equal to the difference between the cell thickness d1 and the cell thickness d3.

Figure 20:
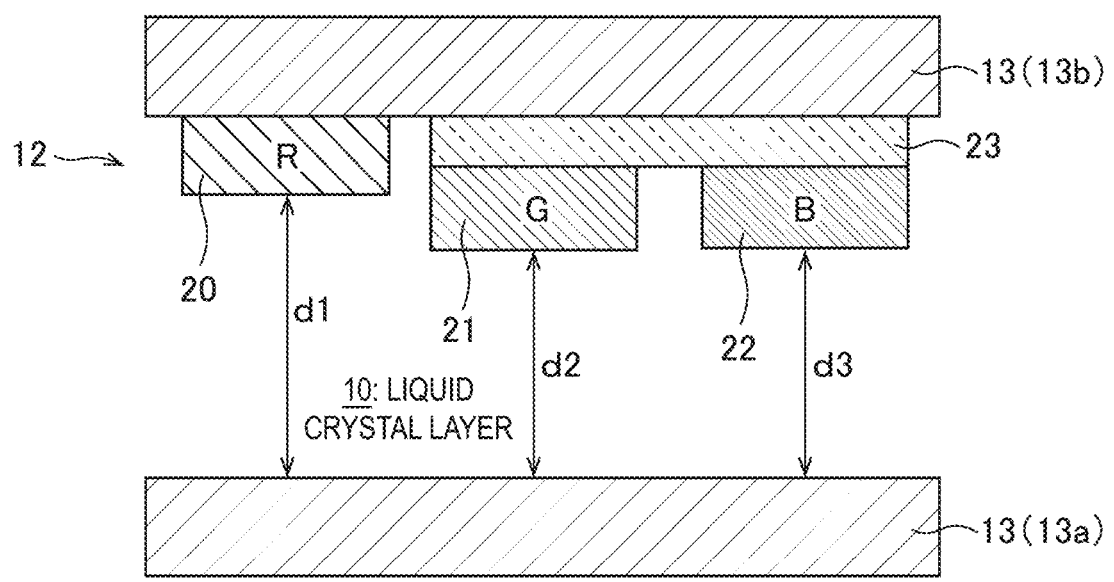
FIG. 20 is a cross-sectional view schematically illustrating a configuration of the liquid crystal layer and the color filter included in the display panel according to the first modified example of the first embodiment of the present invention.

Alternatively, the color filter 12 includes a red optical filter film 20, a green optical filter film 21, and a blue optical filter film 22 having the same film thickness, and also includes a transparent film 23 between the green optical filter film 21 and the blue optical filter film 22 and a second glass substrate 13b as illustrated in FIG. 20. With this configuration, the display panel 1 may have a configuration in which the cell thicknesses d1, d2, and d3 in the liquid crystal layer 10 satisfy the relationship described above. FIG. 20 is a cross-sectional view schematically illustrating a configuration of the liquid crystal layer 10 and the color filter 12 included in the display panel 1 according to the first modified example of the first embodiment of the present invention.

Specifically, the liquid crystal layer 10 is provided between the first glass substrate 13a and the second glass substrate 13b as illustrated in FIG. 20. Additionally, the color filter 12 is disposed on a major surface of the second glass substrate 13b on the liquid crystal layer 10 side. The red optical filter film 20, the green optical filter film 21, and the blue optical filter film 22 included in the color filter 12 have an equal film thickness. However, the transparent film 23 is provided between the green optical filter film 21 and the blue optical filter film 22 and the second glass substrate 13b.

By providing the transparent film 23 as described above, the cell thickness d1 is configured to be thicker than the cell thicknesses d2 and d3 in the liquid crystal layer 10. In addition, the difference between the cell thickness d2 of the liquid crystal layer 10 and the cell thickness d3 of the liquid crystal layer 10 is configured to be less than or equal to half of the difference between the cell thickness d1 of the liquid crystal layer 10 and the cell thickness d3 of the liquid crystal layer 10.

By configuring the color filter 12 of the display panel 1 such that the cell thicknesses d1, d2, and d3 have the above-described relationship in the liquid crystal layer 10 as described above, the color filter 12 can be configured such that the luminance bottom appears within the range of the drive voltage and the cell thicknesses d1, d2, and d3 are reduced as much as possible.

In addition, by setting the cell thicknesses d1, d2, and d3 as described above, the luminance of each of light of the wavelength of R, light of the wavelength of G, and light of the wavelength of B can be controlled so as to reach the luminance bottom.

However, there is a case where a contrast ratio required for the see-through window display 100 is obtained even if the luminance of each of light of the wavelength of R, light of the wavelength of G, and light of the wavelength of B do not reach the luminance bottom when black display is performed. In such a case, the color filter 12 may set the film thickness of each of the red optical filter film 20, the green optical filter film 21, and the blue optical filter film 22 such that a luminance value is smaller than or equal to 5 times the luminance bottom within the range of a drive voltage applied by the drive circuit unit 6 in voltage-luminance characteristics indicating the correlation between the luminance of light transmitted through each of the red optical filter film 20, the green optical filter film 21, and the blue optical filter film 22 and the voltage applied to the liquid crystal layer 10. In other words, with respect to the voltage-luminance characteristics, the cell thicknesses d1, d2, and d3 of the liquid crystal layer 10 corresponding to each of the red optical filter film 20, the green optical filter film 21, and the blue optical filter film 22 may be set such that the value of the luminance is smaller than or equal to 5 times the luminance bottom within the range of the drive voltage.

That is, with respect to the voltage-luminance characteristics, it is preferable to set the cell thicknesses d1, d2, and d3 of the liquid crystal layer 10 such that the luminance of all of light of the wavelength of R, light of the wavelength of G, light of the wavelength of B reaches the luminance bottom within the range of the drive voltage. However, it may be difficult to set the cell thicknesses d1, d2, and d3 such that the luminance of all of light of the wavelength of R, light of the wavelength of G, and light of the wavelength of B reaches the luminance bottom. For this reason, a range smaller than or equal to five times the luminance bottom is defined as the range of luminance acceptable when black display is performed.

However, when the cell thicknesses d1, d2, and d3 are merely set as described above, the luminance of at least one of light of the wavelength of R, light of the wavelength of G, and light of the wavelength of B may be smaller than or equal to five times the luminance bottom and the contrast ratio becomes lower when black display is performed.

Thus, the display panel 1 according to the first modified example of the first embodiment may be configured to change the applied voltage applied to each subpixel by the drive circuit unit 6 when black display is performed. Thus, by changing the applied voltage to each subpixel in this manner, the display panel 1 performs control such that the luminance of each of light of the wavelength of R, light of the wavelength of G, and light of the wavelength of B reaches the luminance bottom.

Figure 21:
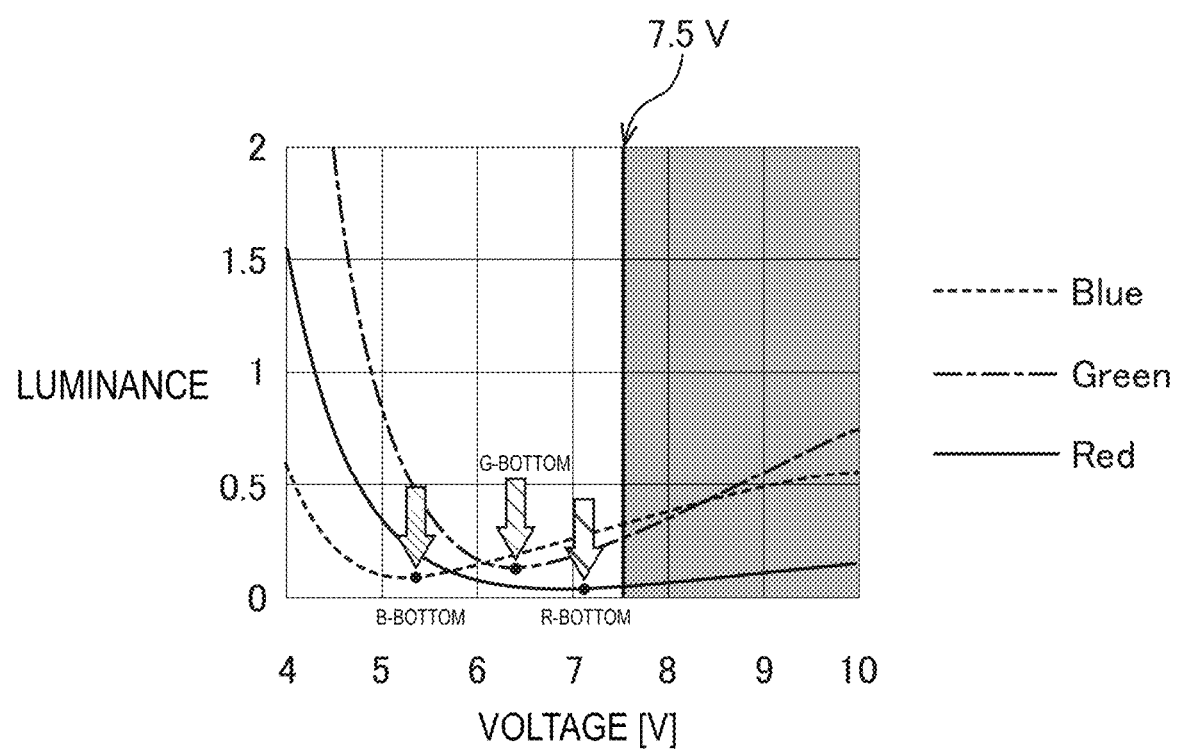
FIG. 21 is a graph showing an example of the correlation between luminance values of light of the wavelength of R, light of the wavelength of G, and light of the wavelength of B and voltages when a drive circuit unit applies a voltage to the display panel according to the first modified example of the first embodiment of the disclosure.

Specifically, the cell thicknesses d1, d2, and d3 and the value of the applied drive voltage are appropriately set to correspond to each subpixel of R, G, and B as shown in FIG. 21. FIG. 21 is a graph showing an example of the correlation between luminance values of each of light of the wavelength of R, light of the wavelength of G, and light of the wavelength of B and voltages when the drive circuit unit 6 applies a voltage to the display panel 1 according to the first modified example of the first embodiment of the disclosure. In the graph shown in FIG. 21, the vertical axis represents luminance and the horizontal axis represents voltage. In addition, the broken line indicates voltage-luminance characteristics of light of the wavelength of B, the one-dot chain line indicates voltage-luminance characteristics of light of the wavelength of G, and the solid line indicates voltage-luminance characteristics of light of the wavelength of R. Further, the correlation shown in the graph of FIG. 21 was obtained under the following conditions.

In other words, the cell thickness d1 of the liquid crystal layer 10 was 3.9 μm, and the cell thickness d2 and the cell thickness d3 were 3.4 μm. In addition, when black display is performed, the applied voltage applied to the liquid crystal layer 10 to correspond to R subpixels was set to 7.2V, the applied voltage applied to the liquid crystal layer 10 to correspond to G subpixels was set to 6.3V, and the applied voltage applied to the liquid crystal layer 10 to correspond to B subpixels was set to 5.3V so that the luminance of each of light of the wavelength of R, light of the wavelength of G, and light of the wavelength of B reaches the luminance bottom.

In this manner, the cell thicknesses d1, d2, and d3, and the applied voltages applied to the liquid crystal layer 10 for each of R, G, and B subpixels can be controlled so that the luminance of each of light of the wavelength of R, light of the wavelength of G, and light of the wavelength of B reaches the luminance bottom when black display is performed. As a result, the display panel 1 can suppress light leakage that occurs when black display is performed and thus can improve the contrast ratio. Therefore, the see-through window display 100 according to the first modified example of the first embodiment can perform satisfactory black display within the range of the drive voltage applied by the drive circuit unit 6.

Second Modified Example

Next, a configuration of a see-through window display 100 according to a second modified example of the first embodiment of the disclosure will be described.

When the see-through window display 100 is in the transparent display state, that is, the background (transmissive image) of the display panel 1 on the back face side is to be displayed, the transmittance of light transmitted through the display panel 1 is also important. In particular, in a case where an illumination unit 3 is not able to freely set luminance of the light source, the transmittance of light transmitted through the display panel 1 is an important element in evaluating the visibility of the transmissive image.

Figure 22:
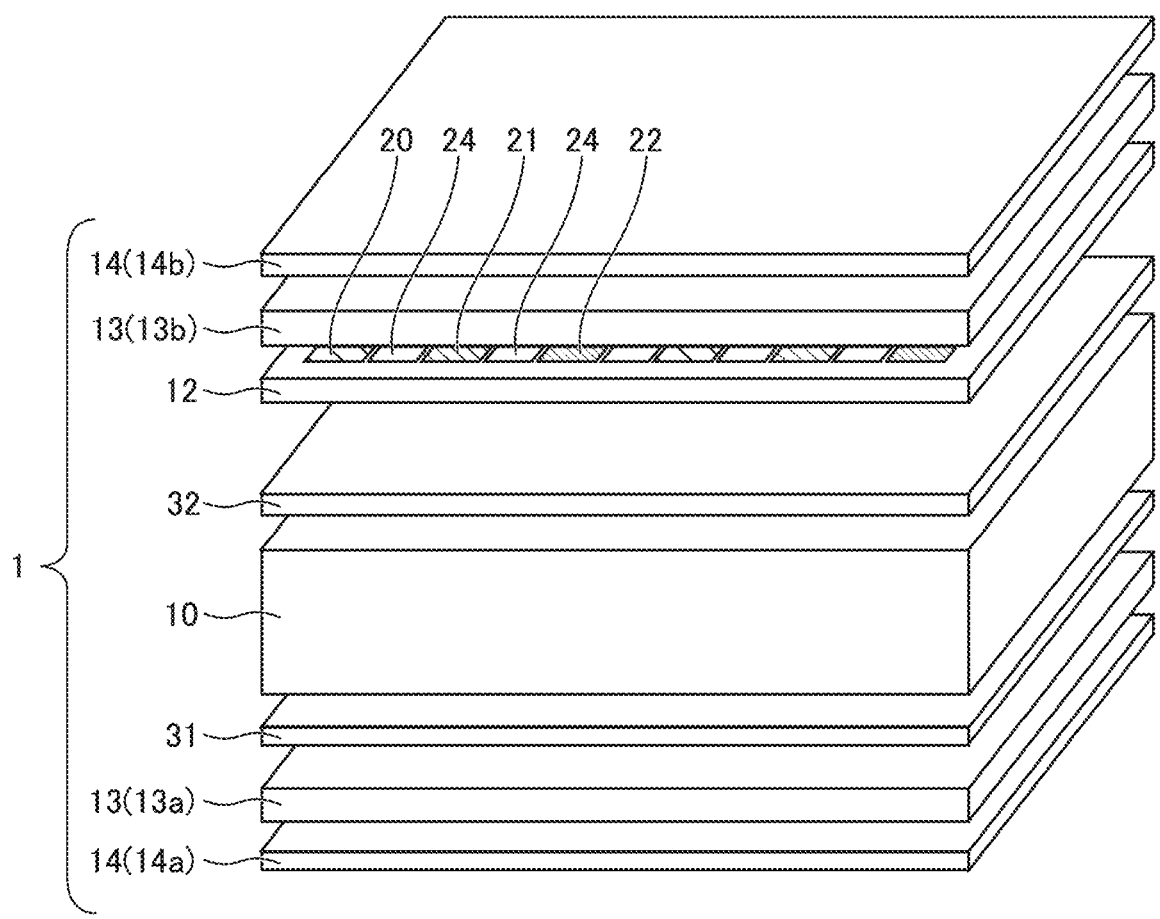
FIG. 22 is a perspective view schematically illustrating a configuration of major parts of a display panel according to a second modified example of the first embodiment of the disclosure.

Therefore, in the see-through window display 100 according to the second modified example of the first embodiment, the color filter 12 is further provided with a white optical filter film 24 in the display panel 1. That is, in the see-through window display 100 according to the second modified example of the first embodiment, further, the color filter 12 further includes the white optical filter film 24 that transmits light to correspond to white subpixels (transparent area) in the configuration of the see-through window display 100 according to the first embodiment and the first modified example of the first embodiment, as illustrated in FIG. 22.

Except for this point, the see-through window display 100 according to the second modified example of the first embodiment has the same configuration as the see-through window display 100 according to the first embodiment and the first modified example of the first embodiment. Thus, similar constituent members are denoted by the same reference signs and descriptions thereof are omitted. Further, FIG. 22 is a perspective view schematically illustrating a configuration of major parts of the display panel 1 according to the second modified example of the first embodiment of the disclosure.

In other words, in the see-through window display 100 according to the first embodiment and the first modified example of the first embodiment, each pixel of a plurality of pixels constituting an image displayed on the display panel 1 includes an R subpixel (red subpixel), a G subpixel (green subpixel), and a B subpixel (blue subpixel). In addition, the color filter 12 has the red optical filter film 20, the green optical filter film 21, and the blue optical filter film 22, and has a configuration in which the films are disposed from the left side in the horizontal direction in this order as illustrated in FIG. 5. That is, the display panel 1 has an array pattern in which a plurality of subpixels are disposed in the horizontal direction in order of an R subpixel, a G subpixel, and a B subpixel.

Figure 23:
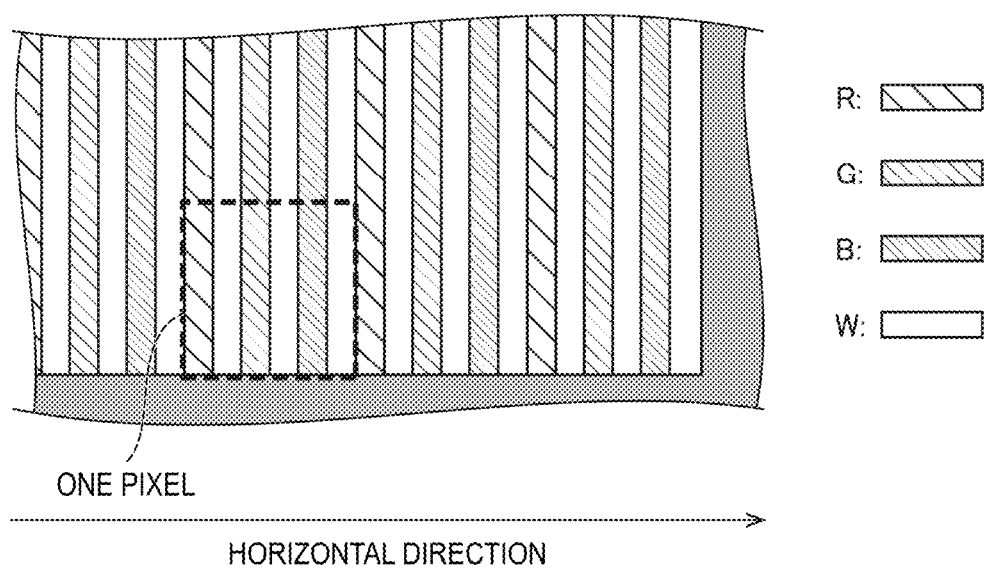
FIG. 23 is a diagram schematically illustrating an example of an array pattern of subpixels constituting each pixel of the display panel according to the second modified example of the first embodiment of the disclosure.

In contrast, in the see-through window display 100 according to the second modified example of the first embodiment, the color filter 12 has a plurality of subpixels disposed in the horizontal direction in the order of an R subpixel, a G subpixel, and a B subpixel as illustrated in FIG. 23. In addition, W subpixels (white subpixels) are interposed between the R subpixel, the G subpixel, and the B subpixel. In other words, each pixel includes an R subpixel, a G subpixel, a B subpixel, and three W subpixels. In addition, these subpixels are arrayed in the order of an R subpixel, a W subpixel, a G subpixel, a W subpixel, a B subpixel, and a W subpixel. FIG. 23 is a diagram schematically illustrating an example of an array pattern of subpixels constituting each pixel of the display panel 1 according to the second modified example of the first embodiment of the disclosure.

Further, the percentage of the W subpixels occupying each pixel may satisfy at least one of the following conditions.

That is, in each pixel, the percentage of the area occupied by the W subpixels with respect to the area occupied by the R subpixel, the G subpixel, and the B subpixel is in the range from 0.5 to 1.5. Additionally, in a case where the areas of the R subpixel, the G subpixel, the B subpixel, and the W subpixels are equal, the number of W subpixels included in each pixel is in a range from 2/3 to 3/3 of the total number of the R subpixel, the G subpixel, and the B subpixel. In other words, in the array pattern of the subpixels illustrated in FIG. 23, the percentage of the area occupied by the W subpixels with respect to the area occupied by the R subpixel, the G subpixel, and the B subpixel is 1.0 in each pixel. The number of W subpixels is 3/3 of the total number of the R subpixel, the G subpixel, and the B subpixel.

Thus, in the see-through window display 100 according to the second modified example of the first embodiment, the transmittance of light transmitted through the display panel 1 can be improved. As a result, the see-through window display 100 can maintain satisfactory display quality.

Further, the array pattern of R subpixel, G subpixel, B subpixel, and W subpixels may be the following array pattern. In other words, a plurality of subpixels may be disposed in order of an R subpixel, a B subpixel, and a G subpixel. In addition, it may be an array pattern in which W subpixels are interposed between each of the R subpixel, the B subpixel, and the G subpixel.

Figure 24:
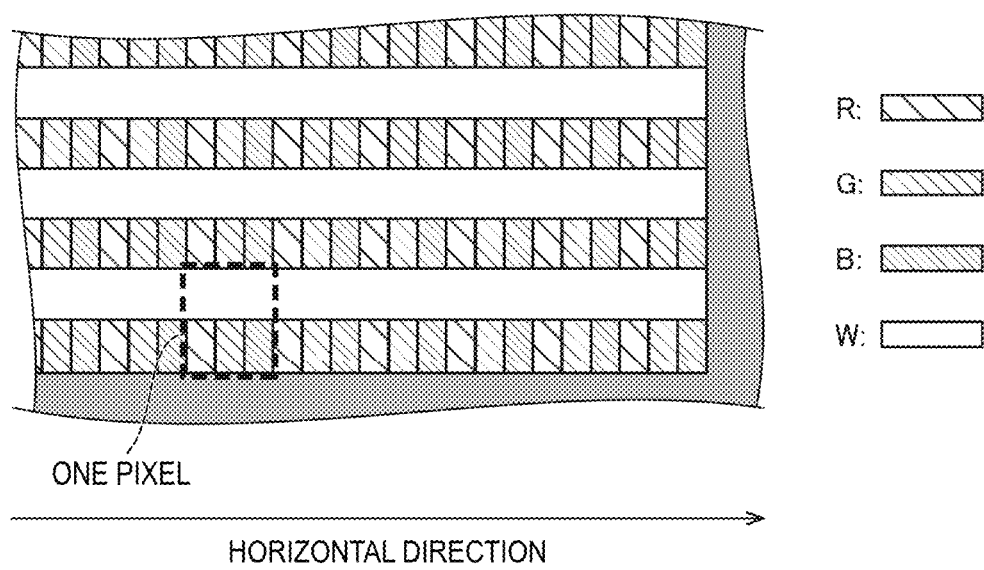
FIG. 24 is a diagram schematically illustrating an example of an array pattern of subpixels constituting each pixel of the display panel according to the second modified example of the first embodiment of the disclosure.

Alternatively, the array pattern of an R subpixel, a G subpixel, a B subpixel, and a W subpixel illustrated in FIG. 24 may be possible. FIG. 24 is a diagram schematically illustrating an example of an array pattern of subpixels constituting each pixel of the display panel 1 according to the second modified example of the first embodiment of the disclosure.

A plurality of subpixels are disposed in the horizontal direction of the display panel 1 in order of an R subpixel, a G subpixel, and a B subpixel as illustrated in FIG. 24. In addition, it is an array pattern in which a plurality of W subpixels (three W subpixels in FIG. 24) extending in the horizontal direction are disposed at equal intervals in the perpendicular direction.

The array pattern illustrated in FIG. 24 also satisfies the above condition which defines a percentage of the area occupied by the W subpixels in each pixel, similar to the array pattern illustrated in FIG. 23.

Figure 25:
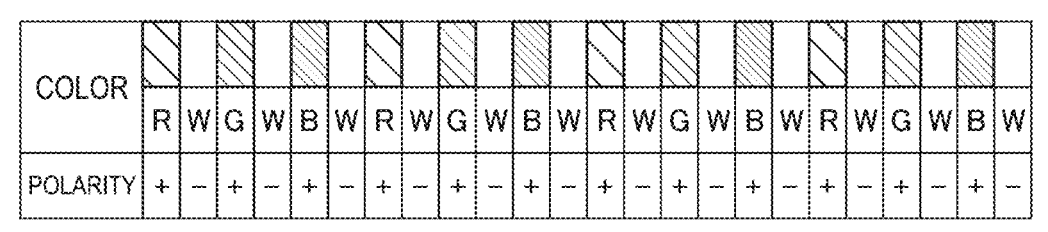

The display panel 1 is AC-driven in order to prevent the occurrence of burning. For this reason, the polarity of the subpixels is inverted per frame. Here, for example, if the display panel 1 is driven to make adjacent subpixels have inverted polarities when the array pattern of the subpixels is in order of an R subpixel, a W subpixel, a G subpixel, a W subpixel, a B subpixel, and a W subpixel as illustrated in FIG. 23, the subpixels have polarities as illustrated in FIG. 25. FIG. 25 is a diagram illustrating an example of a correspondence relationship between an array pattern of subpixels constituting each pixel of the display panel and the polarity of each subpixel according to a Comparative Example of the first embodiment of the disclosure.

When adjacent subpixels are made to have inverted polarities in the array pattern of subpixels as illustrated in FIG. 25, the polarities of all of R subpixels, G subpixels, and B subpixels all match. Thus, in a case where single-color display (e.g., red, etc.) is performed at a low frame frequency of 60 Hz or lower, it may be possible to visually recognize generation of flickering.

Thus, in the see-through window display 100 according to the second modified example of the first embodiment, when adjacent subpixels are set as one subpixel pair in the array pattern of the subpixels, the drive circuit unit 6 (the source driver 60 (see FIG. 27 described below)) performs control such that voltages having different polarities are applied to the pair of adjacent subpixels and the polarity of each subpixel pair is inverted for each frame.

Figure 26:
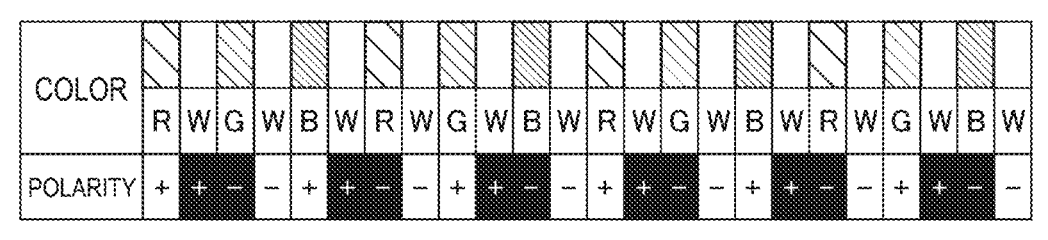

That is, in the array pattern of the subpixels, for example, the first subpixel and the second subpixel are set as a first subpixel pair, the third subpixel and the fourth subpixel are set as a second subpixel pair, and the fifth subpixel and the sixth subpixel are set as a fourth subpixel pair as illustrated in FIG. 26. Then, a voltage is applied so that the adjacent first subpixel pair and the second subpixel pair have different polarities and the second subpixel pair and the third subpixel pair have different polarities. In addition, a voltage is applied from the drive circuit unit 6 to invert the polarity of each subpixel pair per frame. FIG. 26 is a diagram illustrating an example of a correspondence relationship between an array pattern of subpixels constituting each pixel of the display panel 1 and the polarity of each subpixel according to the second modified example of the first embodiment of the disclosure.

In addition, the see-through window display 100 is also configured as follows to invert the polarities as illustrated in FIG. 26. That is, in the relationship between the subpixel array pattern and the polarity illustrated in FIG. 25, for example, wiring connecting line between the output terminal of the drive circuit unit 6 and the input terminal of the display panel 1 cross each other at the second and third subpixels, the sixth and seventh subpixels, the tenth and eleventh subpixels, the 14th and 15th subpixels, the 18th and 19th subpixels, and the 22nd and 23rd subpixels. Further, in FIG. 26, the portion where the polarities are switched by crossing the wiring connecting line between the output terminal of the source driver 60 and the input terminal of the display panel 1 is shown in black.

However, the see-through window display 100 is not limited to the configuration in which the polarities are switched by crossing the wiring connecting line between some subpixels as described above. For example, the design of the TFT substrate (not illustrated) may be changed such that the source driver 60 applies voltages having different polarities to adjacent subpixel pairs.

With the above configuration, the see-through window display 100 according to the second modified example of the first embodiment can prevent all of the R subpixels, all of the G subpixels, and all of the B subpixel from having the same polarities. Thus, even if single-color display (e.g., red, etc.) is performed at a low frame frequency of 60 Hz or lower, generation of flickering can be prevented.

Third Modified Example

Next, a configuration of a see-through window display 100 according to a third modified example of the first embodiment of the disclosure will be described. The see-through window display 100 according to the third modified example of the first embodiment has a configuration in which the saturation of an image displayed on the display panel 1 can be further improved, compared with the configuration of the see-through window display 100 according to the first embodiment, the first modified example of the first embodiment, or the second modified example of the first embodiment.

The see-through window display 100 according to the third modified example of the first embodiment has a similar configuration as the see-through window display 100 according to the first embodiment, the first modified example of the first embodiment, or the second modified example of the first embodiment, except that the configuration of the display panel 1 has been devised to improve the saturation of a displayed image. Thus, similar constituent members are denoted by the same reference signs and descriptions thereof are omitted.

The display panel 1 having a normally white characteristic as described has a lower contrast ratio, compared with a display panel having normally black characteristics. In a case where a contrast ratio is low as described, the color reproduction range of primary colors decreases, and thus the saturation of an image displayed in the display panel 1 decreases.

Figure 27:
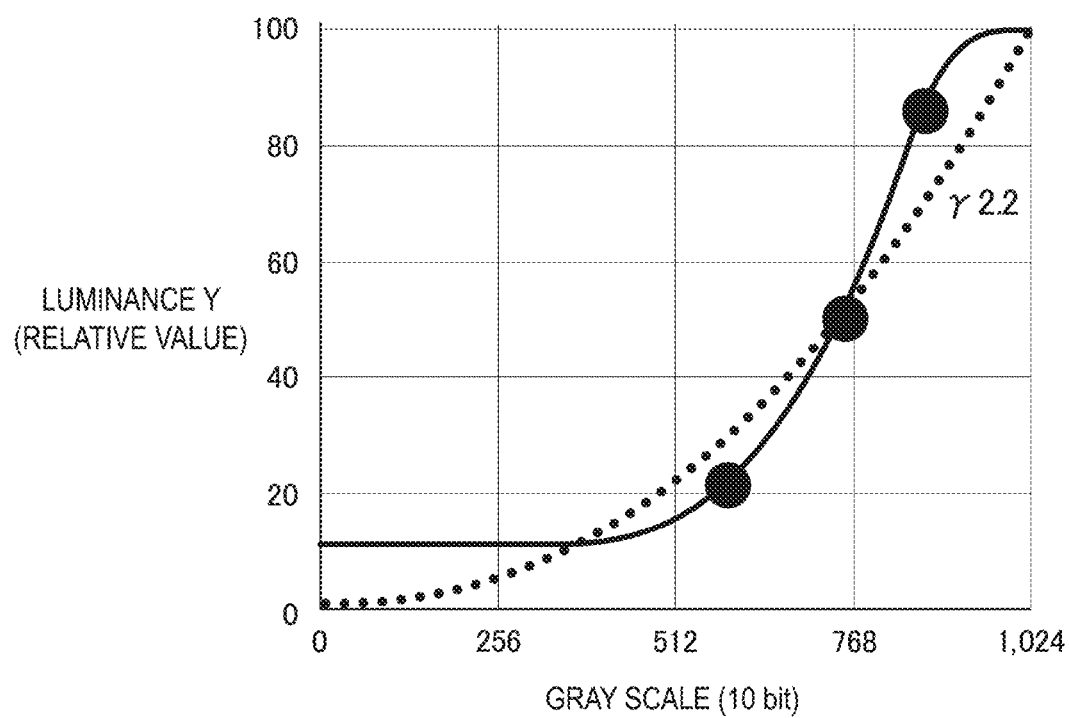
FIG. 27 is a graph showing gray scale-luminance characteristics of a display panel according to a third modified example of the first embodiment of the disclosure.

Therefore, the see-through window display 100 according to the third modified example of the first embodiment is configured to apply a voltage to each pixel of the display panel 1 from the drive circuit unit 6 within the range of the drive voltage such that gray scale-luminance characteristics (γ characteristics) of the display panel 1 become gray scale-luminance characteristics shown in FIG. 27. FIG. 27 is a graph showing gray scale-luminance characteristics of the display panel 1 according to the third modified example of the first embodiment of the disclosure.

In FIG. 27, the vertical axis represents luminance and the horizontal axis represents gray scale. The curve indicated by the dashed line in FIG. 27 indicates gray scale-luminance characteristics of a standard display panel, and the curve indicated by the solid line indicates gray scale-luminance characteristics of the display panel 1.

Further, the gray scale-luminance characteristics of the display panel 1 are color development characteristics that can be indicated by the correlation between the input gray scale (gray scale data) with respect to the display panel 1 and the output (luminance) of the display panel 1. The gray scale-luminance characteristics of the standard display panel (gray scale-luminance characteristics of a display panel serving as a reference) can be expressed using a relational expression that is $Y=L^\gamma$, where L denotes input gray scale data and Y denotes the luminance of the display panel 1. In this case, for example, γ may be set to 2.2. However, the value of γ is not limited to 2.2. For example, the value of γ may be set to a value other than 2.2 depending on the manufacturer of the PC monitor or the manufacturer of the TV set.

In other words, a minimum value of gray scale data L is set to L_min, a maximum value thereof is set to L_max, and arbitrary values of the gray scale data L are set to L_a, L_b, and L_c. In this case, it is assumed that the relationship of L_min<L_a<L_b<L_c<L_max is satisfied.

In addition, luminance Y of the display panel 1 corresponding to L_min, L_a, L_b, L_c, and L_max is denoted by Y_min, Y_a, Y_b, Y_c, and Y_max, respectively. Furthermore, in the relationship between the gray scale data L and the luminance Y, if a value of the gray scale data L is L_b and luminance Y is Y_b, these are values on the curve indicating the gray scale-luminance characteristics of the standard display panel ($Y=L^\gamma$). In this case, the relationship of Equation (3) below is established.

$$(Y\_b - Y\_\min) \div (Y\_\max - Y\_\min) = ((L\_b - L\_\min) \div (L\_\max - L\_\min))^\gamma \quad (3)$$

Thus, γ can be defined as a value satisfying the relationship of Equation (4) below using Equation (3).

$$\gamma = \log((Y\_b - Y\_\min) \div (Y\_\max - Y\_\min)) \div \log((L\_b - L\_\min) \div (L\_\max - L\_\min)) \quad (4)$$

When y is defined as shown in Equation (4), the drive circuit unit 6 applies a voltage to each pixel of the display panel 1 so that Y_a and Y_c satisfy the Relationships (5) and (6) described below, respectively.

$$Y\_a < ((L\_a - L\_\min) \div (L\_\max - L\_\min))^\gamma \quad (5)$$

$$Y\_c > ((L\_c - L\_\min) \div (L\_\max - L\_\min))^\gamma \quad (6)$$

Specifically, the see-through window display 100 includes the drive circuit unit 6 configured to apply a voltage to each pixel of the display panel 1 for driving as illustrated in FIG. 2 described above. The drive circuit unit 6 includes the source driver 60 that supplies a voltage corresponding to input gray scale data (for example, any value among 0 to 1024 levels of gray scale) to the display panel 1 when the gray scale data is input from the outside.

In accordance with the input gray scale data, the source driver 60 applies a voltage within the range of the drive voltage of the display panel 1 (e.g., 2.2 V to 7.5 V) to the display panel 1. In this way, the voltage in accordance with the input gray scale data is applied to the display panel 1, and the luminance of an image displayed on the display panel 1 is determined.

As described above, when the relationship between the gray scale data input to the source driver 60 and the voltage applied to the display panel 1 by the source driver 60 in accordance with the gray scale data is defined using y shown in Equation (4), the luminance Y_a and Y_c satisfy the relationships of Relationships (5) and (6).

Thus, compensation can be made such that the luminance of Y_a of the gray scale data that is lower than Y_b decreases. Hence, the dark portion can be compensated for to become darker. Conversely, compensation can be made such that the luminance of Y_c of the gray scale data that is higher than Y_b increases. Hence, the bright portion can be compensated for to become brighter. As a result, even a low-contrast panel can give the impression of a video displayed on a high-contrast panel.

Further, the drive circuit unit 6 includes a memory (not illustrated), and may store a look-up table indicating a relationship between the gray scale data described above and the voltage applied to the display panel 1 for controlling the luminance in accordance with the gray scale data in the memory. In addition, the source driver 60 may apply a voltage corresponding to the gray scale data to the display panel 1 by referring to the look-up table when receiving the input of the gray scale data.

Thus, the see-through window display 100 according to the third modified example of the first embodiment is configured such that luminance Y_a and luminance Y_c satisfy the relationship between Relationships (5) and (6) described above when the relationship between the gray scale data input to the source driver 60 and the voltage applied to the display panel 1 by the source driver 60 in accordance with the gray scale data is defined such that γ is shown in Equation (4). As a result, the saturation of an image displayed on the display panel 1 can be improved.

Second Embodiment

Figure 28:
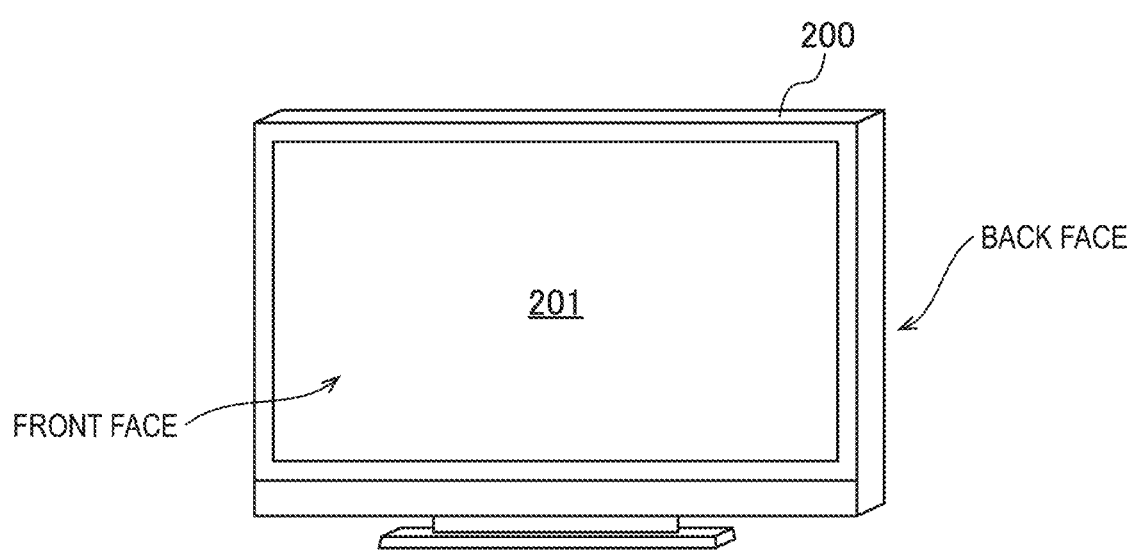
FIG. 28 is a perspective view illustrating an example of a liquid crystal display according to a second embodiment of the disclosure.
Figure 29:
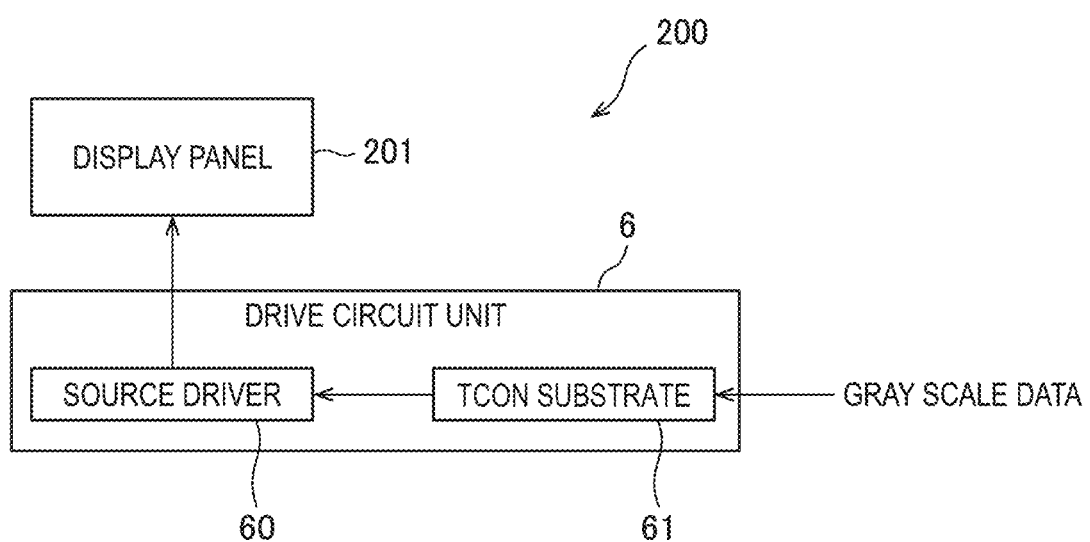
FIG. 29 is a block diagram illustrating an example of a configuration of major parts of the liquid crystal display illustrated in FIG. 28.
Figure 30:
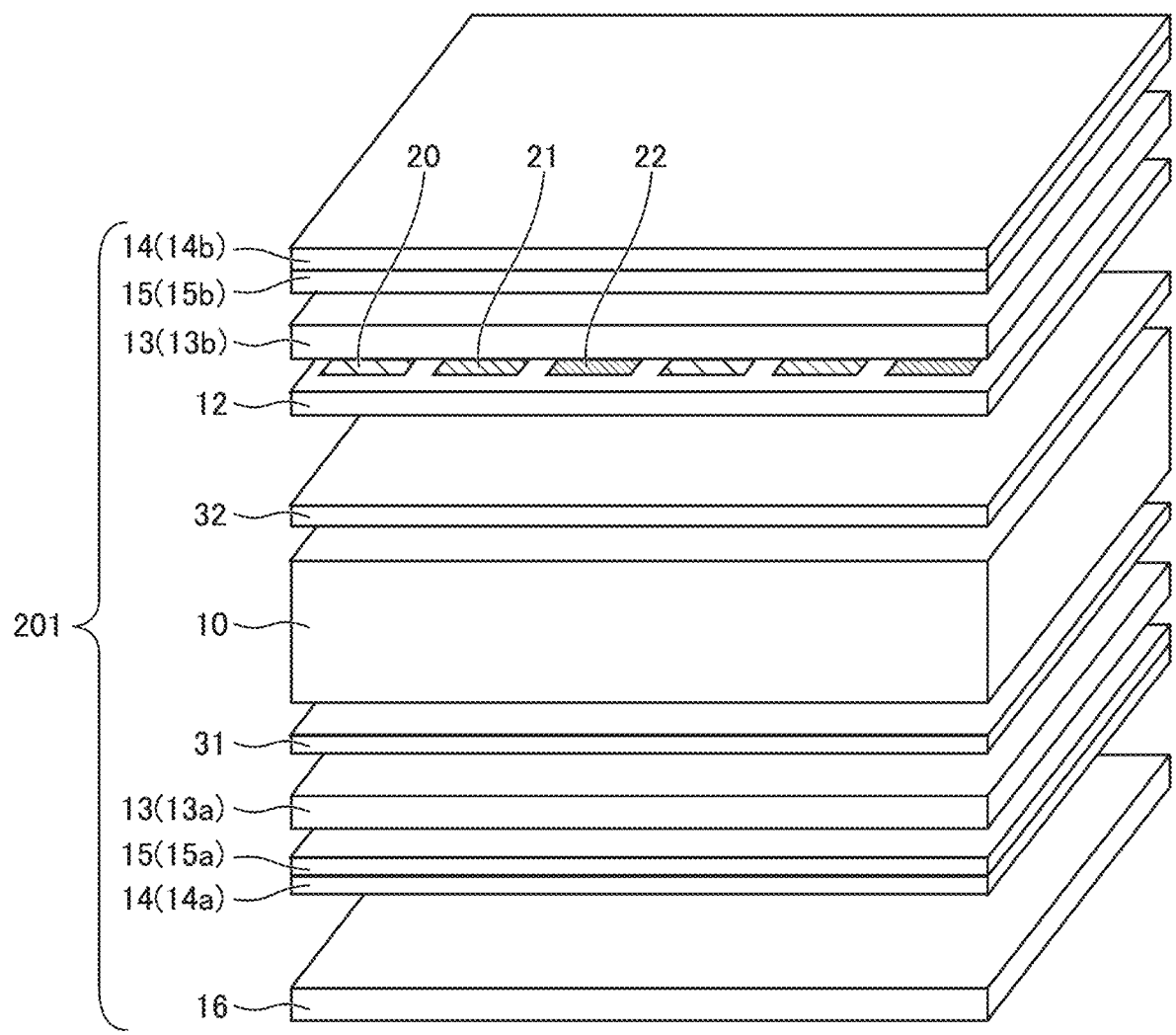
FIG. 30 is a perspective view schematically illustrating a configuration of major parts of a display panel included in the liquid crystal display illustrated in FIG. 28.
Figure 31:
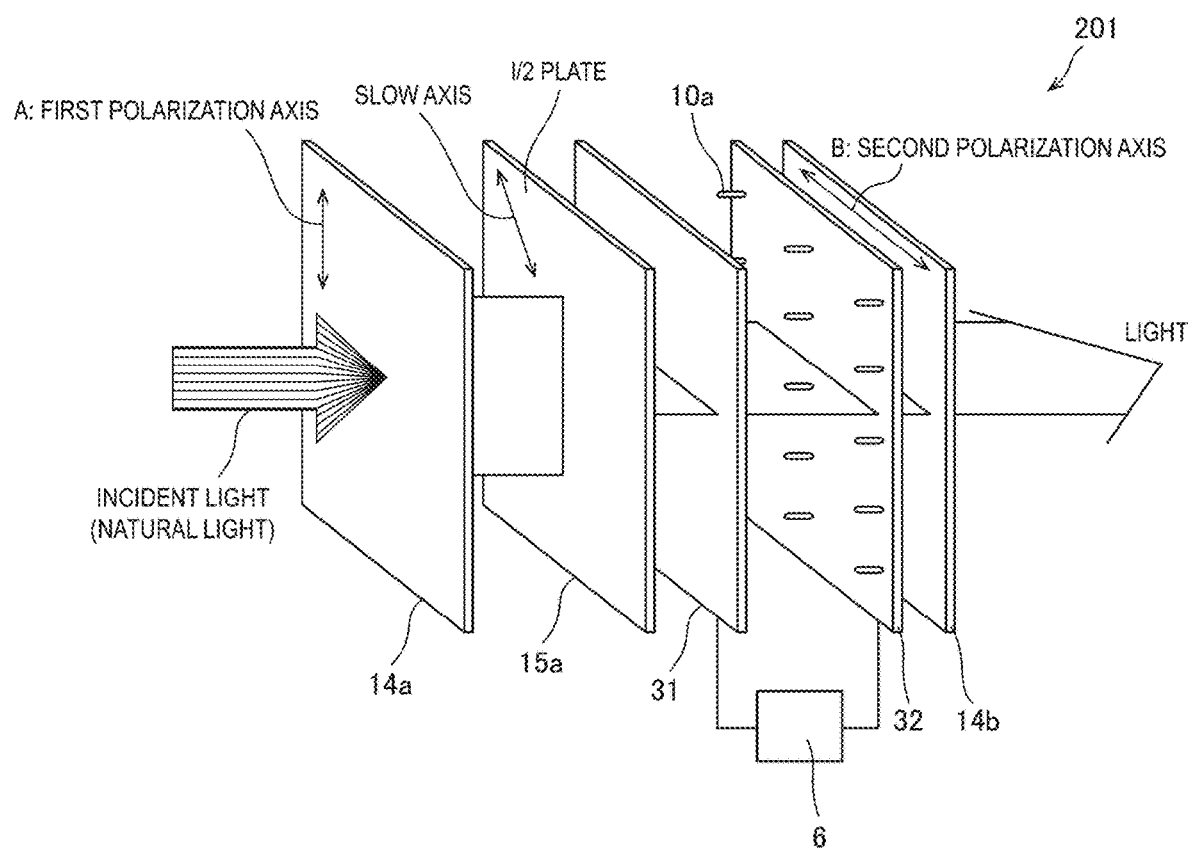
FIG. 31 is a perspective view schematically illustrating an example of a transmission state of light through a display panel included in a liquid crystal display according to a modified example of the second embodiment of the disclosure.

Next, a liquid crystal display 200 according to a second embodiment of the disclosure will be described with reference to FIGS. 28, 29, and 30. FIG. 28 is a perspective view illustrating an example of a liquid crystal display 200 according to the second embodiment of the disclosure. FIG. 29 is a block diagram illustrating an example of a configuration of major parts of the liquid crystal display 200 illustrated in FIG. 28. FIG. 30 is a perspective view schematically illustrating a configuration of major parts of a display panel 201 included in the liquid crystal display 200 illustrated in FIG. 28. FIG. 31 is a perspective view schematically illustrating an example of a transmission state of light through the display panel 201 illustrated in FIG. 30.

The liquid crystal display 200 according to the second embodiment is a display device that displays an image such as a video as illustrated in FIG. 28. The liquid crystal display 200 includes the display panel 201 and a drive circuit unit 6 as illustrated in FIG. 29 and the back face of the display panel 201 is covered by a back face plate (not illustrated) that does not transmit light.

The display panel 201 includes a liquid crystal layer 10, a first electrode 31, a second electrode 32, a color filter 12, a pair of glass substrates 13, a pair of polarizers 14, a pair of retardation films 15, and a backlight 16 as illustrated in FIG. 30. In other words, the display panel 201 has a similar configuration to the display panel 1 according to the first embodiment except that the retardation film 15 and the backlight 16 are further provided. Thus, similar members are denoted by the same reference signs and descriptions thereof are omitted.

The backlight 16 is a light source for displaying images on the liquid crystal display 200. The backlight 16 is provided in the display panel 201 on the back face side of the liquid crystal layer 10, and emits light from the back face side toward the front side.

The retardation films 15 are optical films that change the polarization characteristics of light transmitted through the liquid crystal layer 10 or the polarizers 14, and include a first retardation film 15a and a second retardation film 15b. The first retardation film 15a is provided between the liquid crystal layer 10 and the first polarizer 14a, and more specifically, between the first glass substrate 13a and the first polarizer 14a. On the other hand, the second retardation film 15b is provided between the liquid crystal layer 10 and the second polarizer 14b, and more specifically, between the second glass substrate 13b and the second polarizer 14b.

Because the liquid crystal display 200 includes the retardation films 15, even if a situation occurs where the retardation value of the liquid crystal layer 10 at the time of black display does not reach λ/2 and thus sufficient black display is not possible, the situation can be improved. Specifically, even though a maximum voltage (a voltage at which luminance becomes TB) that can be applied by the drive circuit unit 6 in the drive voltage range is applied to the liquid crystal layer 10, for example, if the retardation value of the liquid crystal layer 10 reaches only up to 230 nm when the wavelength λ, of light is 550 nm, by using a retardation film having a retardation value of 45 nm as the first retardation film 15a, the total retardation value of the liquid crystal layer 10 and the retardation film is 275 nm, which is sufficient for black display. Further, if the retardation films 15 are used to realize satisfactory black display in the liquid crystal layer 10 as described above, white luminance also decreases, but if the retardation value of the retardation films 15 is 50 nm or less, adverse effects are minor and the effect of achieving sufficient black display is larger.

More specifically, it is assumed that an axis parallel to the axis obtained by rotating a first polarization axis A 45 degrees clockwise is set as an a-axis, and an axis parallel to the axis obtained by rotating the first polarization axis A 45 degrees counterclockwise is set as a b-axis. Here, the axis direction of the slow axis of both the first retardation film 15a and second retardation film 15b matches the axis direction of the a-axis, or the axis direction of the b-axis. In addition, in the display panel 201, the phase difference of light transmitted through the first retardation film 15a is 50 nm or less, and the phase difference of light transmitted through the second retardation film 15b is 50 nm or less.

Further, if the axis direction of the slow axis of the first retardation film 15a and the second retardation film 15b matches the axis direction of the a-axis, the axis direction of a fast axis of the first retardation film 15a and the second retardation film 15b matches the axis direction of the b-axis. Conversely, if the axis direction of the slow axis of the first retardation film 15a and the second retardation film 15b described above matches the axis direction of the b-axis, the axis direction of the fast axis of the first retardation film 15a and the second retardation film 15b matches the axis direction of the a-axis. For this reason, a value indicating anisotropy of refractive index of the retardation films 15 can be $\Delta n = |na - nb|$, like the value indicating anisotropy of refractive index of the liquid crystal layer 10 defined in the first embodiment. In addition, the phase difference of light transmitted through the retardation films 15 is can be obtained from $d_{Pf} \Delta n$, where the thickness of the retardation films 15 is $d_{Pf}$.

Additionally, the slow axis of the liquid crystal layer 10 also matches the a-axis or the b-axis, and when the applied voltage applied to the display panel 201 is lower than or equal to a threshold voltage, the phase difference of light transmitted through the liquid crystal layer 10 is also less than or equal to 50 nm. Thus, the phase difference of the liquid crystal layer 10 can be obtained from dΔn as defined in the first embodiment.

As described above, the display panel 201 has the configuration with a normally white characteristic, and the phase difference of light transmitted through the retardation films 15 is less than or equal to 50 nm. Thus, in the display panel 201, when the liquid crystal molecules are in an initial alignment, the transmittance of light emitted from the backlight 16 and transmitted through the liquid crystal layer 10 and the polarizers 14 can be increased.

In the liquid crystal display 200, a drive mode of the display panel 201 is a VA mode, similarly to the display panel 1 included in the see-through window display 100 according to the first embodiment. That is, a first electrode 31 is provided as a pixel electrode on the first glass substrate 13a side, a second electrode 32 is provided as a common electrode on the second glass substrate 13b side, and an electrical field is applied from the first electrode 31 to the second electrode 32. Further, when the applied voltage is lower than or equal to a threshold voltage, a plurality of liquid crystal molecules 10a are aligned in a uniform state. Further, detailed description of the VA mode is omitted since it is described in the first embodiment.

In addition, the drive mode of the display panel 201 is not limited to the VA mode. For example, the drive mode of the display panel 201 may be an IPS mode. When the drive mode is the IPS mode, the display panel 201 is provided with the first electrode 31 (a pixel electrode) serving as a pixel electrode and the second electrode 32 (a counter electrode) serving as a common electrode on the first glass substrate 13a, and an electrical field is applied parallel to the in-plane direction of the first glass substrate 13a. That is, when the applied voltage is lower than or equal to the threshold voltage, the plurality of liquid crystal molecules 10a are aligned such that they are parallel to the in-plane direction of the liquid crystal layer 10 and the long axis thereof is substantially perpendicular to the first polarization axis A. Alternatively, when the applied voltage is lower than or equal to the threshold voltage, the plurality of liquid crystal molecules 10a are aligned such that they are parallel to the in-plane direction of the liquid crystal layer 10 and the long axis thereof is substantially parallel to the first polarization axis A. Further, detailed description of the IPS mode is omitted since it is described in the first embodiment. Furthermore, the drive mode of the display panel 201 may be an FFS mode. The case where the drive mode is the FFS mode is omitted because it is described in the first embodiment.

When the applied voltage is lower than or equal to the threshold voltage in the display panel 201, the electrical field does not act on each of the plurality of liquid crystal molecules 10a. For this reason, the alignment of the plurality of liquid crystal molecules remains in the initial alignment in which the liquid crystal molecules are uniformly aligned. For this reason, the liquid crystal layer 10 has a uniform refractive index.

Further, the display panel 201 according to the second embodiment may have a configuration in which the contrast ratio can be improved in the image display state, similarly to the display panel 1 according to the first modified example of the first embodiment.

In other words, the display panel 201 includes a color filter 12 including a red optical filter film 20 that transmits light corresponding to the wavelength range of red subpixels, a green optical filter film 21 that transmits light corresponding to the wavelength range of green subpixels, and a blue optical filter film 22 that transmits light corresponding to the wavelength range of blue subpixels. In addition, by devising the film thickness of each of the red optical filter film 20, the green optical filter film 21, and the blue optical filter film 22 included in the color filter 12, the cell thickness of the liquid crystal layer 10 corresponding to each of the red optical filter film 20, the green optical filter film 21, and the blue optical filter film 22 is adjusted.

In addition, it is configured such that light of the wavelength of R transmitted through the red optical filter film 20, light of the wavelength of G transmitted through the green optical filter film 21, and light of the wavelength of B transmitted through the blue optical filter film 22 can have a luminance bottom within the range of the drive voltage of the display panel 201.

In other words, the color filter 12 is configured such that the film thickness of the red optical filter film 20 is thinner than the film thickness of each of the blue optical filter film 22 and the green optical filter film 21, and the difference between the film thickness of the red optical filter film 20 and the film thickness of the green optical filter film 21 is less than or equal to half of the difference between the film thickness of the red optical filter film 20 and the film thickness of the blue optical filter film 22.

In other words, the color filter 12 has a cell thickness of the liquid crystal layer 10 corresponding to the red optical filter film 20 thicker than the cell thickness of the liquid crystal layer 10 corresponding to the green optical filter film 21 and the cell thickness of the liquid crystal layer 10 corresponding to the blue optical filter film 22. In addition, the difference between the cell thickness of the liquid crystal layer 10 corresponding to the red optical filter film 20 and the cell thickness of the liquid crystal layer 10 corresponding to the green optical filter film 21 is configured to be less than or equal to half of the difference between the cell thickness of the liquid crystal layer 10 corresponding to the red optical filter film 20 and the cell thickness of the liquid crystal layer 10 corresponding to the blue optical filter film 22.

Alternatively, the color filter 12 may include the red optical filter film 20, the green optical filter film 21, and the blue optical filter film 22 having the same film thickness, and also include a transparent film 23 between the green optical filter film 21 and the blue optical filter film 22 and a second glass substrate 13b. With this configuration, the cell thicknesses in the liquid crystal layer 10 may satisfy the relationship described above.

As described above, the display panel 201 included in the liquid crystal display 200 according to the second embodiment can include the color filter 12 such that the cell thicknesses in the liquid crystal layer 10 satisfy the relationship described above in the same manner as the display panel 1 included in the see-through window display 100 according to the first embodiment.

For this reason, the display panel 201 can be controlled such that the luminance of each of light of the wavelength of R, light of the wavelength of G, and light of the wavelength of B reaches the luminance bottom.

However, there is a case where a contrast ratio required for the liquid crystal display 200 is obtained even if the luminance of each of light of the wavelength of R, light of the wavelength of G, and light of the wavelength of B do not reach the luminance bottom when black display is performed. In such a case, in the color filter 12, the film thickness of each of the red optical filter film 20, the green optical filter film 21, and the blue optical filter film 22 may be set such that the luminance value is smaller than or equal to 5 times the luminance bottom within the range of a drive voltage in voltage-luminance characteristics indicating the correlation between the luminance of light transmitted through each of the red optical filter film 20, the green optical filter film 21, and the blue optical filter film 22 and the voltage applied to the liquid crystal layer 10. Alternatively, with respect to the voltage-luminance characteristics, a cell thickness of the liquid crystal layer 10 corresponding to the red optical filter film 20, a cell thickness of the liquid crystal layer 10 corresponding to the green optical filter film 21, and a cell thickness of the liquid crystal layer 10 corresponding to the blue optical filter film 22 may be set such that the value of the luminance is smaller than or equal to 5 times the luminance bottom within the range of the drive voltage.

Furthermore, the display panel 201 according to the second embodiment may be configured to change the applied voltage applied to each subpixel by the drive circuit unit 6 when black display is performed, similarly to the display panel 1 according to the first embodiment. Thus, by changing the applied voltage applied to each subpixel in this manner, the display panel 201 may perform control such that the luminance of each of light of the wavelength of R, light of the wavelength of G, and light of the wavelength of B reaches the luminance bottom.

Furthermore, the display panel 201 according to the second embodiment may be configured to improve the transmittance of light transmitted through the liquid crystal layer 10 and the polarizers 14 of the display panel 201, similarly to the display panel 1 according to the second modified example of the first embodiment. That is, each pixel of the plurality of pixels constituting an image displayed on the display panel 201 includes a red subpixel, a green subpixel, a blue subpixel, and a white subpixel. Furthermore, the color filter 12 is configured to include a white optical filter film 24 that transmits light corresponding to the white subpixel in addition to the red optical filter film 20, the green optical filter film 21, and the blue optical filter film 22. In addition, the color filter 12 may be configured such that the ratio of the area occupied by the white subpixel to the area occupied by the red subpixel, the green subpixel, and the blue subpixel is in a range from 0.5 to 1.5 in each pixel.

Alternatively, the color filter 12 may be configured such that, in a case where the areas of the red subpixel, the green subpixel, the blue subpixel, and the white subpixel are equal in each pixel, the ratio of the number of white subpixels to the total number of the red subpixel, the green subpixel, and the blue subpixel is in the range from 2/3 to 3/3.

In addition, the array pattern of the subpixels may be a pattern in which the red subpixels, the green subpixels, and the blue subpixels are disposed in order in the horizontal direction of the display panel 201, and the white subpixels are interposed between each of the red subpixels, the green subpixels, and the blue subpixels as illustrated in FIG. 23 and FIG. 25. Alternatively, the array pattern of the subpixels may be a pattern in which the red subpixels, the blue subpixels, and the green subpixels are disposed in order in the horizontal direction of the display panel 201, and the white subpixels are interposed between each of the red subpixels, the blue subpixels, and the green subpixels.

Additionally, in the case where the array pattern of the subpixels is the above-described pattern in the liquid crystal display 200 according to the second embodiment, the drive circuit unit 6 is configured to apply a voltage to the display panel 201 as described below in the same manner as the see-through window display 100 according to the second modified example of the first embodiment.

That is, a set of adjacent subpixels forms a subpixel pair, and the drive circuit unit 6 applies voltages with different polarities to the display panel 20 for adjacent subpixel pairs 1. Additionally, the drive circuit unit 6 applies a voltage to the display panel 201 to invert the polarity of each subpixel pair for each frame.

With the above-described configuration, the liquid crystal display 200 according to the second embodiment can prevent the occurrence of flickering even at a low frame frequency of 60 Hz or lower, for example.

Furthermore, the liquid crystal display 200 according to the second embodiment may be configured to improve the saturation of a displayed image, similarly to the see-through window display 100 according to the third modified example of the first embodiment.

That is, in the liquid crystal display 200 according to the second embodiment, the drive circuit unit 6 includes the source driver 60 and the TCON substrate 61 and a TCON substrate 61 that, when gray scale data (for example, any value among 0 to 1024 levels of gray scale) is input from the outside, supply a voltage corresponding to the input gray scale data to the display panel 201. In other words, the gray scale data is input to the source driver 60 via the TCON substrate 61. The source driver 60 is configured to apply a voltage within the range of the drive voltage of the display panel 201 to each pixel of the display panel 201 according to the input gray scale data.

Here, for the liquid crystal display 200 according to the second embodiment, in a case where the minimum value of gray scale data input from the outside is set to L_min, the maximum value is set to L_max, and arbitrary values of the gray scale data are set to L_a, L_b, and L_c, and the relationship of L_min<L_a<L_b<L_c<L_max is satisfied, luminance values of the display panel 201 for L_min, L_a, L_b, L_c, and L_max are set to Y_min, Y_a, Y_b, Y_c, and Y_max, respectively, similarly to the see-through window display 100 according to the third modified example of the first embodiment. It is assumed that, among these, L_b and Y_b satisfy the relationship $Y=L^\gamma$ indicating gray scale-luminance characteristics of the display panel 201, which is standard (gray scale-luminance characteristics of the display panel 201, which is standard). Here, γ satisfies γ=log ((Y_b−Y_min)÷(Y_max−Y_min))÷log ((L_b−L_min)÷(L_max−L_min)).

When γ is defined as described above, the source driver 60 included in the drive circuit unit 6 applies a voltage to the display panel 201 such that the luminance Y_a and the luminance Y_c satisfy the relationships of Y_a<((L_a−L_min)÷(L_max−L_min))$^\gamma$ and Y_c>((L_c−L_min)÷(L_max−L_min))$^\gamma$.

As a result, the liquid crystal display 200 according to the second embodiment can improve the saturation of an image displayed on the display panel 201. Further, it can be said that the polarizer has a function of emitting incident natural light as linearly polarized light. Thus, the polarizer may include not only the above-mentioned polarizers 14 but also the retardation films 15 having the function of rotating the polarization axis. The polarization axis also serves as a polarization axis of emitted linearly polarized light. Thus, in the liquid crystal display 200 according to the second embodiment, the polarizers 14 and the retardation films 15 can be collectively regarded as a polarizer.

Modified Example

Next, a configuration of a liquid crystal display 200 according to a modified example of the second embodiment will be described with reference to FIG. 31. FIG. 31 is a perspective view schematically illustrating an example of a transmission state of light through a display panel 201 included in the liquid crystal display 200 according to the modified example of the second embodiment of the disclosure.

In the liquid crystal display 200 according to the second embodiment, the opposing first polarizer 14a and second polarizer 14b are disposed in a parallel nicols arrangement. On the contrary, the liquid crystal display 200 according to the modified example of the second embodiment has a first polarizer 14a and a second polarizer 14b disposed in a cross nicols arrangement as illustrated in FIG. 31. In addition, a first retardation film 15a is provided between a liquid crystal layer 10 and the first polarizer 14a.

In the liquid crystal display 200 according to the modified example of the second embodiment, the axis direction of a first polarization axis A is a perpendicular direction along the main surface of the first polarizer 14a standing in the perpendicular direction, and the axis direction of a second polarization axis B is a horizontal direction along the main surface of the second polarizer 14b standing in the perpendicular direction as illustrated in FIG. 31. The slow axis of the first retardation film 15a is in an axis direction extending in a direction in which the first polarization axis A is rotated 45 degrees counterclockwise when viewed in the propagation direction of incident light. Furthermore, the polarization axis of linearly polarized light emitted through the first polarizer 14a and the first retardation film 15a and the polarization axis of linearly polarized light emitted from the second polarizer 14b are parallel to each other.

In other words, the slow axis of the first retardation film 15a is parallel to a line segment that equally divides the angle formed by the first polarization axis A and the second polarization axis B when viewed in the propagation direction of the incident light. In addition, the retardation of the first retardation film 15a is ½ of the wavelength transmitted through the first retardation film 15a.

Further, although the first retardation film 15a is provided between the first polarizer 14a and a first electrode 31 in the configuration illustrated in FIG. 31, a second retardation film 15b may be further provided between the second polarizer 14b and a second electrode 32. In the configuration including the first retardation film 15a and the second retardation film 15b, the sum of the retardation of the first retardation film 15a and the retardation of the second retardation film 15b is ½ of the wavelength of light. In other words, each of the first retardation film 15a and the second retardation film 15b is a λ/4 retardation film.

Further, the display panel 201 included in the liquid crystal display 200 according to the second embodiment and the modified example of the second embodiment can be applied as a display panel constituting a see-through window display.

While there have been described what are at present considered to be certain embodiments of the application, it will be understood that various modifications may be made thereto, and it is intended that the appended claim cover all such modifications as fall within the true spirit and scope of the application.

What is claimed is:

1. A see-through window display comprising:
a display panel having a plurality of pixels; and
a drive circuit configured to apply a voltage according to input gray scale data to the plurality of pixels,
wherein the display panel includes:
  a first substrate having a pixel electrode,
  a second substrate,
  a liquid crystal layer interposed between the first substrate and the second substrate,
  a first polarizer provided on the first substrate, the first polarizer having a first polarization axis, and
  a second polarizer provided on the second substrate, the second polarizer having a second polarization axis,
when a transmittance of each of the plurality of pixels, when the drive circuit applies a minimum voltage to the plurality of pixels, is set to TW, and when a transmittance of each of the plurality of pixels, when the drive circuit applies a maximum voltage to the plurality of pixels, is set to TB, the display panel has a normally white characteristic satisfying a relationship of TW>TB, and
the normally white characteristic of the display panel has a structure in which, when:
  a first axis that is parallel to an axis created by rotating the first polarization axis 45 degrees clockwise is set to an a-axis,
  a second axis that is parallel to an axis created by rotating the first polarization axis 45 degrees counterclockwise is set to a b-axis,
  an a-axis component of a refractive index of the liquid crystal layer is set to 'na' and a b-axis component of a refractive index of the liquid crystal layer is set to 'nb', and
  a value indicating anisotropy of the refractive index of the liquid crystal layer being a difference between a refractive index of the a-axis component and a refractive index of the b-axis component is set to $\Delta n=|na-nb|$,
  a first value of $\Delta n$ when the voltage applied to the plurality of pixels by the drive circuit is lower than or equal to a threshold voltage indicating a boundary of alignment change of liquid crystal molecules of the liquid crystal layer is smaller than a second value of $\Delta n$ when the voltage applied by the drive circuit is higher than the threshold voltage.

2. The see-through window display according to claim 1, wherein the second polarization axis is parallel to the first polarization axis.

3. The see-through window display according to claim 1, wherein the liquid crystal layer includes the liquid crystal molecules having negative anisotropy of dielectric constant, and
when the voltage applied to the plurality of pixels by the drive circuit is lower than or equal to the threshold voltage, the liquid crystal molecules are aligned in a direction in which a long axis of the liquid crystal molecules is perpendicular to an in-plane direction of the liquid crystal layer.

4. The see-through window display according to claim 1, wherein the liquid crystal layer includes the liquid crystal molecules, and
when the voltage applied to the plurality of pixels by the drive circuit is lower than or equal to the threshold voltage, the liquid crystal molecules are aligned in a direction in which the long axis of the liquid crystal molecules is parallel to an in-plane direction of the liquid crystal layer and parallel to or perpendicular to the first polarization axis.

5. A see-through window display comprising:
a display panel having a plurality of pixels; and
a drive circuit configured to apply a voltage according to input gray scale data to the plurality of pixels,
wherein the display panel includes:
  a first substrate having a pixel electrode,
  a second substrate,
  a liquid crystal layer interposed between the first substrate and the second substrate,
  a first polarizer provided on the first substrate, the first polarizer having a first polarization axis, and
  a second polarizer provided on the second substrate, the second polarizer having a second polarization axis,
when a transmittance of each of the plurality of pixels, when the drive circuit applies a minimum voltage to the plurality of pixels, is set to TW, and when a transmittance of each of the plurality of pixels, when the drive circuit applies a maximum voltage to the plurality of pixels, is set to TB, the display panel has a normally white characteristic satisfying a relationship of TW>TB, the normally white characteristic of the display panel has a structure in which, when:
- a first axis that is parallel to an axis created by rotating the first polarization axis 45 degrees clockwise is set to an a-axis,
- a second axis that is parallel to an axis created by rotating the first polarization axis 45 degrees counterclockwise is set to a b-axis,
- an a-axis component of a refractive index of the liquid crystal layer is set to 'na' and a b-axis component of a refractive index of the liquid crystal layer is set to 'nb',
- a value indicating anisotropy of the refractive index of the liquid crystal layer being a difference between a refractive index of the a-axis component and a refractive index of the b-axis component is set to $\Delta n = |na - nb|$,
- a thickness of the liquid crystal layer is set to d, and
- a phase difference of the liquid crystal layer is set to $d\Delta n$,
- a value of $d\Delta n$ when the voltage applied to the plurality of pixels by the drive circuit is lower than or equal to a threshold voltage indicating a boundary of alignment change of liquid crystal molecules of the liquid crystal layer is smaller than or equal to 50 nm.

6. The see-through window display according to claim 5, wherein the second polarization axis is parallel to the first polarization axis.

\* \* \* \* \*